United States Patent
Lee et al.

(10) Patent No.: US 12,447,181 B2
(45) Date of Patent: Oct. 21, 2025

(54) METHOD OF ISOLATION OF CULTURE OF VASCULAR ENDOTHELIAL CELLS, MEDIUM FOR MAINTAINING CHARACTERISTICS OF VASCULAR ENDOTHELIAL CELLS, AND CULTURE METHOD INCLUDING SAME

(71) Applicant: Karis Bio Inc., Seoul (KR)

(72) Inventors: Shin Jeong Lee, Seoul (KR); Young Sup Yoon, Seoul (KR)

(73) Assignee: KARIS BIO INC., Seoul (KR)

( * ) Notice: Subject to any disclaimer, the term of this patent is extended or adjusted under 35 U.S.C. 154(b) by 668 days.

(21) Appl. No.: 17/775,767

(22) PCT Filed: Nov. 11, 2020

(86) PCT No.: PCT/KR2020/015785
§ 371 (c)(1),
(2) Date: May 10, 2022

(87) PCT Pub. No.: WO2021/096218
PCT Pub. Date: May 20, 2021

(65) Prior Publication Data
US 2022/0378845 A1    Dec. 1, 2022

(30) Foreign Application Priority Data

Nov. 13, 2019 (KR) .......... 10-2019-0145337
Nov. 13, 2019 (KR) .......... 10-2019-0145348

(51) Int. Cl.
*A61K 35/44* (2015.01)
*C12N 5/074* (2010.01)

(52) U.S. Cl.
CPC ............ *A61K 35/44* (2013.01); *C12N 5/0607* (2013.01); *C12N 2501/11* (2013.01); *C12N 2501/115* (2013.01); *C12N 2501/165* (2013.01); *C12N 2506/03* (2013.01)

(58) Field of Classification Search
CPC .............................. A61K 35/44; C12N 5/0607
See application file for complete search history.

(56) References Cited

U.S. PATENT DOCUMENTS

| | | | |
|---|---|---|---|
| 2003/0194802 A1 | 10/2003 | Itskovitz-Eldor et al. |
| 2013/0210141 A1 | 8/2013 | Rajesh et al. |
| 2013/0287751 A1 | 10/2013 | Kaufman et al. |
| 2015/0017674 A1 | 1/2015 | Christensen et al. |
| 2018/0320137 A1 | 11/2018 | Valamehr et al. |

FOREIGN PATENT DOCUMENTS

| | | |
|---|---|---|
| CN | 103620024 A | 3/2014 |
| EP | 2 718 425 A1 | 4/2014 |
| JP | 2010-131373 A | 6/2010 |
| JP | 2015-519890 A | 7/2015 |
| KR | 1020110122858 A | 11/2011 |
| KR | 1020170007694 A | 1/2017 |
| KR | 1020180066263 A | 6/2018 |
| WO | 2012/168167 A1 | 12/2012 |
| WO | 2017/200486 A1 | 11/2017 |
| WO | WO-2019025826 A1 | 2/2019 |

OTHER PUBLICATIONS

May JM, Harrison FE. Role of vitamin C in the function of the vascular endothelium. Antioxid Redox Signal. ;19(17):2068-2083. doi: 10.1089/ars.2013.5205 (Year: 2013).*
Olsen AL, Bloomer SA, Chan EP, et al. Hepatic stellate cells require a stiff environment for myofibroblastic differentiation. Am J Physiol Gastrointest Liver Physiol.;301(1):G110-G118. doi:10.1152/ajpgi.00412.2010 (Year: 2011).*
Trimm E, Red-Horse K. Vascular endothelial cell development and diversity. Nat Rev Cardiol.;20(3):197-210. doi:10.1038/s41569-022-00770-1 (Year: 2023).*
Liang, Qing-Qing, and Lei Liu. "Application of vascular endothelial cells in stem cell medicine." World journal of clinical cases vol. 9,35: 10765-10780. doi:10.12998/wjcc.v9.i35.10765 (Year: 2021).*
Davies, J.Q., Gordon, S. Isolation and Culture of Human Macrophages. In: Helgason, C.D., Miller, C.L. (eds) Basic Cell Culture Protocols. Methods in Molecular Biology™, Humana Press. vol 290. https://doi.org/10.1385/1-59259-838-2:105 (Year: 2005).*
Choudhury, Aaheli Roy et al, Cell Isolation, Mater Methods, 2017;7:2260 (Year: 2017).*
Liu X, Qi J, Xu X, Zeisberg M, Guan K, Zeisberg EM. Differentiation of functional endothelial cells from human induced pluripotent stem cells: a novel, highly efficient and cost effective method. Differentiation. 2016;92(4):225-236. doi:10.1016/j.diff.2016.05.004 (Year: 2016).*
Y. Cao et al., "Regenerative medicine in cardiovascular diseases—an update", European Review for Medical and Pharmacological Sciences, 2017, vol. 21, pp. 1335-1340 (6 pages total).
Office Action issued Apr. 11, 2023 in Canadian Application No. 3,156,948.

(Continued)

*Primary Examiner* — Teresa E Knight
*Assistant Examiner* — Kodye Lee Abbott
(74) *Attorney, Agent, or Firm* — Sughrue Mion, PLLC

(57) ABSTRACT

The present specification provides: a method of isolation of a pure culture of vascular endothelial cells, the method capable of isolating homogeneous endothelial cells adhered to a matrix for a specific time in a cell line of an endothelial cell lineage differentiated from human pluripotent stem cells; a medium for maintaining characteristics of vascular endothelial cells, comprising high-purity vascular endothelial cells isolated through the method, 4 ng/ml to 6 ng/ml of FGF2, 5 ng/ml to 10 ng/ml of EGF, 10 ng/ml to 30 ng/ml of VEGF-A, 20 ng/ml to 50 ng/ml of ascorbic acid, and DMEM/F-12 as active ingredients; and a culture method comprising same.

11 Claims, 27 Drawing Sheets

(56) References Cited

OTHER PUBLICATIONS

Office Action issued Jun. 6, 2023 in Japanese Application No. 2022-526288.
Decision to Grant a Patent mailed Apr. 2, 2024 for JP 2022-526288.
Notice of Reasons for Refusal mailed Nov. 7, 2023 for JP 2022-526288.
Aja Harding, et al., "Highly Efficient Differentiation of Endothelial Cells from Pluripotent Stem Cells Requires the MAPK and the PI3K Pathways", Stem Cells, 2017, vol. 35, pp. 909-919 (12 pages total).
Xiaojun Lian, et al., "Efficient Differentiation of Human Pluripotent Stem Cells to Endothelial Progenitors via Small-Molecule Activation of WNT Signaling", Stem Cell Reports, Nov. 11, 2014, vol. 3, pp. 804-816 (13 pages total).
Lee, S.J. et al., "Enhanced Therapeutic and Long-Term Dynamic Vascularization Effects of Human Pluripotent Stem Cell-Derived Endothelial Cells Encapsulated in a Nanomatric Gel", Circulation 2017, vol. 136, pp. 1939-1954.
Lee, S.J. et al. "Generation of Human Pluripotent Stem Cell-Derived Endothelial Cells and Their Therapeutic Utility", Curr. Cardiol. Rep. 2018, vol. 20, No. 6, document 45, inner pp. 1-12.
Notification of Reason for Refusal issued in Korean Application No. 1020190145337, dispatched date of Aug. 26, 2020.
Notice of Final Rejection issued in Korean Application No. 1020190145337, dispatched date of Feb. 5, 2021.
Grant of Patent issued in Korean Application No. 1020190145337, dispatched date of Apr. 12, 2021.
Notification of Reason for Refusal issued in Korean Application No. 1020190145348, dispatched date of Aug. 26, 2020.
Notice of Final Rejection issued in Korean Application No. 1020190145348, dispatched date of Feb. 19, 2021.
Grant of Patent issued in Korean Application No. 1020190145348, dispatched date of Apr. 15, 2021.
International Search Report (English and Korean) and Written Opinion of the ISA (Korean) issued in PCT/KR2020/015785, mailed Feb. 17, 2021; ISA/KR.

* cited by examiner (a)

HETEROGENEOUS COLONY COMPOSED OF ENDOTHELIAL CELL LINEAGES (Heterogeneous)

(b)

(a)

SEQUENTIAL ATTACHMENT TO PLATE
(SEPARATION OF ADHERENT AND SUSPENSION CELL)

(b)

(a)

SELECTION OF PURE ENDOTHELIAL CELLS (b)

METHOD OF ISOLATION OF CULTURE OF VASCULAR ENDOTHELIAL CELLS, MEDIUM FOR MAINTAINING CHARACTERISTICS OF VASCULAR ENDOTHELIAL CELLS, AND CULTURE METHOD INCLUDING SAME

CROSS-REFERENCE TO RELATED APPLICATIONS

This application is a U.S. National Phase Application under 35 U.S.C. 371 of International Application No. PCT/KR2020/015785, filed on Nov. 11, 2020, which claims the benefit of Korean Patent Application No. 10-2019-0145337, filed on Nov. 13, 2019 and Korean Patent Application No. 10-2019-0145348, filed on Nov. 13, 2019. The entire disclosures of the above applications are incorporated herein by reference.

TECHNICAL FIELD

The present invention relates to a method of separating pure vascular endothelial cells, a maintenance medium of vascular endothelial cell characteristics, and a culture method including the same.

BACKGROUND ART

Angiogenesis (vasculogenesis) refers to a process in which the extracellular matrix (ECM) is decomposed, endothelial cells of existing blood vessels are migrated, divided, and differentiated to form new capillaries. Accordingly, such vasculogenesis may be involved in various physiological and pathological phenomena, such as wound repair, embryogenesis, tumor formation, chronic inflammation, and obesity.

Angiogenesis may be particularly essential for wound healing or tissue regeneration. For example, if there is a lack of angiogenesis in the body, necrosis, ulceration, and ischemia may occur, leading to dysfunction of tissues or organs. Furthermore, as the blood supply is not smooth, cardiovascular diseases such as ischemic heart disease, arteriosclerosis, myocardial infarction, and angina may also be caused. Accordingly, there has been a need for the development of a treatment method for inducing or promoting angiogenesis to reduce tissue damage caused by the deficiency of angiogenesis and to treat cardiovascular diseases caused thereby.

The description of the background of the present invention has been prepared in order to facilitate understanding of the present invention. It is not to be construed as an admission that the matters described in the background technology of the invention exist as prior art.

DETAILED DESCRIPTION OF THE INVENTION

Technical Problems

Human embryonic stem cells (hESCs) isolated from embryos and human induced pluripotent stem cells (hiPSCs) made from somatic cells may differentiate into endothelial cells that play an important role in the formation of blood vessels so that they can be used for vascular regeneration therapy. Accordingly, a vascular regeneration therapy has been proposed using endothelial cells differentiated from human pluripotent stem cells as a new strategy for regenerating damaged blood vessels and further inducing the formation of blood vessels.

Meanwhile, the inventors of the present invention recognized the importance of the purity of endothelial cells differentiated from induced pluripotent stem cells and their survival rate in vivo in the effect of vascular regeneration treatment.

Accordingly, the inventors of the present invention studied a method for isolating endothelial cells having angiogenic ability with high purity from various cell lines differentiated from human induced pluripotent stem cells.

As a result, the inventors of the present invention have found that matrix adhesion varies depending on the characteristics of differentiated endothelial cells. When cells were separated according to a specific adhesion time due to matrix adhesion, homogeneous vascular endothelial cells could be isolated with high purity.

The object to be achieved is to provide a method of separating pure vascular endothelial cells, capable of separating homogeneous endothelial cells adhered to a matrix for a specific time from a cell line of an endothelial cell lineage differentiated from human pluripotent stem cells, and high purity vascular endothelial cells separated by this method.

Pluripotent stem cells have self-renewal ability and can differentiate into various cells, so they can be used for vascular regeneration therapy. Accordingly, as a new strategy to restore ischemic tissue function, provided is a vascular regeneration therapy using vascular endothelial cells (ECs) differentiated from embryonic stem cells isolated from embryos and induced pluripotent stem cells made from somatic cells.

Meanwhile, the inventors of the present invention recognized that the potential risk factors of pluripotent stem cells such as the development of tumors and abnormal tissues, the use of animal components used in the differentiation process, and the low differentiation rate of stem cells into vascular endothelial cells in vitro may cause side effects or insignificant therapeutic effects in vascular regeneration treatment.

Meanwhile, in order to artificially differentiate and maintain pluripotent stem cells into endothelial cells in vitro, an environment that fully satisfies environment conditions such as nutrients, pH, temperature, and osmotic pressure close to in vivo conditions based on body fluids such as a plasma or lymph fluid must be provided while supplying a suitable culture medium. There is a problem in which as stem cells and endothelial cells are repeatedly cultured in vitro or are stimulated from outside, the shape, size, and characteristics of the cells are microscopically modified or changed, and the regenerative capacity, proliferation and differentiation capacity of the cells is lowered, that is, aging.

Therefore, when stem cells and endothelial cells are cultured in vitro in an unsuitable culture medium, the stem cells and endothelial cells easily age and lose their ability to proliferate and differentiate. Furthermore, since stem cells and endothelial cells have heterogeneity in which differentiation into unwanted cells is induced depending on culture conditions, the development of a culture medium and culture method for stem cells and endothelial cells is essential for stem cell research and is very important technical field.

The inventors of the present invention recognized the importance of the purity and maintaining characteristics of endothelial cells differentiated from human pluripotent stem cells in the effect of vascular regeneration treatment.

Accordingly, the inventors of the present invention have studied a culture medium and culture method that can isolate endothelial cells with high angiogenic ability from a cell line differentiated from human pluripotent stem cells with high purity and can allow long-term culture while promoting cell proliferation and maintaining the same cell characteristics as in the initial state during in vitro culture.

As a result, the inventors of the present invention found that when adding FGF and EGF, cell growth factors, VEGF-A, a cell signaling substance and ascorbic acid, an antioxidant, to DMEM/F-12, a basic medium, and used for cell culture, high-purity vascular endothelial cells with the characteristics of vascular endothelial cells were maintained even in repeated culture. Accordingly, the inventors of the present invention have developed a maintenance medium of vascular endothelial cell characteristics capable of maintaining and proliferating vascular endothelial cells differentiated from human pluripotent stem cells in high purity.

Accordingly, the object of the present invention is to provide a maintenance medium of vascular endothelial cell characteristics in which vascular endothelial cells differentiated from human pluripotent stem cells can proliferate while maintaining their characteristics even in repeated culture.

Another object of the present invention is to provide a culture method of maintaining vascular endothelial cell characteristics capable of culturing high-purity vascular endothelial cells from human pluripotent stem cells, and high-purity vascular endothelial cells cultured therethrough.

The objects of the present invention are not limited to the objects mentioned above, and other objects not mentioned will be clearly understood by those skilled in the art from the following description.

Means for Solving the Problems

According to an example of the present invention, provided is a method of separating pure vascular endothelial cells, the method including steps of: obtaining a cell line of an endothelial cell lineage differentiated from human pluripotent stem cells from a differentiation medium; filtering the obtained cell line using a filter; culturing the filtered cell line on a matrix; and separating only homogenous endothelial cells attached to the matrix from the cultured cell line for 20 hours or less.

As used herein, the term "human pluripotent stem cell" may refer to a cell having the ability to self-proliferate indefinitely while maintaining an undifferentiated state and the differentiation ability to differentiate into all cells of the human body, and may include at least one of embryonic stem cells, induced pluripotent stem cells (iPSCs), and somatic cell nuclear transfer cells (SCNTs).

As used herein, the term "endothelial cell" may refer to a squamous cell constituting the layer covering the inner walls of blood vessels and lymphatic vessels. Accordingly, the endothelial cell may be used as the same meaning as the "vascular endothelial cell."

Meanwhile, in vascular regeneration therapy, stem cells, for example, endothelial cells differentiated from human pluripotent stem cells can be transplanted in vivo as a cell therapeutic agent to regenerate damaged blood vessels and induce vasculogenesis or angiogenesis. In this case, the purity of the endothelial cells used for treatment may also be related to the prognosis for vascular regeneration treatment. More specifically, when undifferentiated endothelial cells or endothelial cells mixed with other cell lines of the mesoderm lineage or impurities are transplanted into ischemic tissue, the survival rate of endothelial cells may decrease. Accordingly, as transplanted endothelial cells cannot contribute to blood vessel formation for a long period of time in regenerative treatment, the use of endothelial cells with low purity may lead to a decrease in the therapeutic effect.

Accordingly, sorting endothelial cells with high purity and maintaining their properties at a high level may be related to not only increasing the yield of endothelial cells themselves, but also enhancing the effect of cell regeneration treatment using the same.

As used herein, the term "filter" is a cell collection device and may refer to a screen for separating and collecting target cells having a certain size from a fluid sample. For example, the filter is used to remove impurities or cell clumps that may lower the purity of the cells and to select only cells having a certain size, thereby increasing the purity. Accordingly, according to a feature of the present invention, the pore spacing of the filter for screening high-purity vascular endothelial cells may be in the range of 20 μm to 40 μm.

As used herein, the term "matrix" is a component to which cells may be adhered and may refer to basic materials of connective tissue. More specifically, living biological cells can be cultured in vitro in an organism's matrix. Here, the matrix intended for in vitro culture can control interactions with cells, that is, adhesion, differentiation, proliferation, and migration, etc., by the functionalized region of the surface. For example, different types of cells have different adhesion proteins on their surface. As these adhesion proteins vary according to each type of cell, they may selectively have an adhesion affinity with a functionalized region of the matrix. Therefore, as the culture proceeds for cell differentiation and proliferation, the adhesion affinity with the matrix can be determined by the secretion difference of the adhesion protein depending on the type of cell. Thus, the interaction, i.e., adhesion with the matrix may be caused at different times. Accordingly, the vascular endothelial cells can be adhered to the collagen matrix from 4 hours to 20 hours in culture. Furthermore, if the culture is carried out for more than 20 hours, cells having characteristics other than vascular endothelial cells are attached to the matrix, and the purity may be lowered during cell separation. In addition, if the culture is carried out for less than 4 hours, the vascular endothelial cells may not adhere to the matrix and thus vascular endothelial cells may not be obtained.

Accordingly, vascular endothelial cells are cultured on a matrix to allow selective culture according to time by specific surface adhesion, that is, adhesion affinity with the matrix, shown in vascular endothelial cells. Furthermore, according to another feature of the present invention, the matrix may include at least one of collagen, fibrin, fibronectin, vitronectin, Matrigel™, gelatin, laminin, heparin, polylysine, and hyaluronic acid, but may include 1 mg/ml or less, preferably 0.1 mg/ml of collagen. However, the matrix is not limited thereto, and any material to which vascular endothelial cells can selectively adhere may be used without limitation.

According to still another feature of the present invention, in the above-described culturing step, a cell line of an endothelial cell lineage filtered in DMEM/F-12 medium containing cell growth factors and ascorbic acid may be cultured. Here, the cell growth factor may refer to a substance that may promote cell division, cell growth and differentiation, and may include at least one of fibroblast growth factor-1 (FGF-1), FGF-2 (bFGF), FGF-3, FGF-4, FGF-5, FGF-6, epidermal growth factor (EGF), keratinocyte growth factor (KGF), hepatocyte growth factor (HGF), transforming growth factor-α (TGF-α), TGF-β, angiopoietin 1, angiopoietin 2, erythropoietin, neuropilin, IGF-1, osteopoline, pleiotrophin, activin, endothelin 01 and vascular endothelial growth factor-A (VEGF-A), but is not limited thereto.

Furthermore, as an antioxidant, ascorbic acid is involved in procollagen synthesis and may refer to a cofactor related to an increase in type 1 collagen production. Ascorbic acid can stimulate and regulate the proliferation of various mesoderm-derived cells such as endothelial cells, adipocytes, osteoblasts, and chondrocytes in vitro. Furthermore, when ascorbic acid is added to the cell culture medium at a specific concentration, it acts as a cell growth promoter to increase cell proliferation and promote DNA synthesis.

Meanwhile, DMEM/F-12 is a basal medium. In this case, as used herein the term "basic medium" refers to a mixture containing sugar, amino acids and water, which are necessary for cells to survive, indicating a mixture excluding serum, nutritional substances and various growth factors. The basic medium of the present invention may be artificially synthesized and used, or a commercially prepared medium may be used. For example, the commercially prepared medium may include Dulbecco's modified eagle's medium (DMEM), minimal essential medium (MEM), basal medium eagle (BME), RPMI 1640, F-10, F-12, α-minimal essential medium (α-MEM), Glasgow's Minimal Essential Medium (G-MEM), Iscove's modified Dulbecco's medium, and fetal bovine serum (FBS), and preferably DMEM/F-12, but is not limited thereto.

According to still another feature of the present invention, the above-described culturing step may include seeding the filtered endothelial cell line on two matrices. In this case, when the cell line is divided and cultured in more than two matrices, the selection yield of vascular endothelial cells may decrease, and thus the proliferation efficiency and characteristic maintenance of vascular endothelial cells may decrease during the passage.

Meanwhile, as used herein, the term "homogeneous" may refer to the same cell type having the same morphological shape and marker expression pattern observed on a microscope. In this case, the marker is any material that can distinguish the target cell from other cells in the vicinity and may include at least one of the group consisting of proteins, glycolipids, nucleic acids, and combinations thereof, but is not limited thereto. More specifically, the marker for vascular endothelial cells may be a protein specifically expressed in vascular endothelial cells, and may include CDH5, VWF, PECAM1, TEK and KDR, but preferably CDH5 and VWF.

The expression level of these markers for vascular endothelial cells can be increased by the method of separating the pure vascular endothelial cells according to an example of the present invention. More specifically, the gene expression level of CDH5, which is a specific marker for vascular endothelial cells, may be 12 times higher than before separation by the method of separating the pure vascular endothelial cells. In addition, the gene expression level of VWF, which is a specific marker for vascular endothelial cells, may be twice as high as before separation by the method of separating the pure vascular endothelial cells.

Furthermore, the increase in homogeneous endothelial cells may mean that endothelial cells with high purity can be provided. Using high-purity endothelial cells may be associated with vasculogenesis or vascular regenerating effects. For example, when low-purity endothelial cells including undifferentiated stem cells or mesodermal stem cells are transplanted into ischemic tissue, the effect of vasculogenesis or vascular regeneration may be lower than when high-purity endothelial cells are transplanted. Accordingly, it can be very important to isolate high-purity endothelial cells.

According to one example of the present invention, provided is a vascular endothelial cell containing 98% or more of homogeneous endothelial cells expressing CDH5 and VWF separated by the above-described method.

In addition, according to one example of the present invention, the present invention provides a cell therapeutic composition for preventing or treating cardiovascular diseases, the composition including the above-described vascular endothelial cells.

In this case, as used herein, the term "cardiovascular disease" may refer to a disease occurring in the heart and major arteries. The cause may be poor blood supply due to a lack of blood vessel formation. In the present invention, cardiovascular disease may include at least one of ischemic heart disease, heart failure, hypertensive heart disease, arrhythmia, cardiomyopathy, ventricular septal defect, congenital heart disease, myocardial infarction, pericardial disease, stroke, peripheral vascular disease, aneurysm, arteriosclerosis, hypertension, angina pectoris and myocardial infarction. In particular, it may be particularly effective for ischemic cardiovascular diseases among various cardiovascular diseases. However, the effect as a cell therapeutic agent for prevention or treatment for endothelial cells is not limited to ischemic cardiovascular disease.

As used herein, the term "cell therapeutic agent" refers to any drug used for treatment, diagnosis, and prevention purposes through a series of actions such as proliferating or selecting living autologous, allogenic, and xenogenic cells in vitro or changing the biological properties of the cells to restore the functions of cells and tissues. As used herein, the cell therapeutic agent may refer to cells themselves that can be transplanted to repair damaged tissues. For example, the cell therapeutic agent may be endothelial cells differentiated from human pluripotent stem cells that are transplanted to the ischemic site and contribute to angiogenesis.

According to one example of the present invention, provided is a culture method of maintaining vascular endothelial cell characteristics, the method including: first seeding step to suspend human pluripotent stem cells (hPSCs) with an induction medium and to seed the suspension on a plate; first culture step to differentiate the first seeded stem cells into mesoderm cells in an induction medium; second culture step to differentiate the first cultured cells into endothelial cells in a differentiation medium; selection step of cells of the vascular endothelial cell lineage from the second cultured cells; second seeding step to suspend the selected vascular endothelial cells with a maintenance medium and to seed the suspension on a plate; and passage culture step to proliferate the second seeded vascular endothelial cells in the maintenance medium.

As used herein, the term "medium" refers to a mixture for the growth and proliferation of cells such as stem cells in vitro that contains essential elements for the growth and proliferation of cells such as sugar, amino acids, various nutrients, serum, growth factors, and minerals.

At this time, according to a feature of the present invention, the present invention may include an induction medium, a differentiation medium and a maintenance medium. More specifically, the induction medium refers to a culture medium capable of inducing undifferentiated human pluripotent stem cells into mesoderm and may include 4 ng/ml to 6 ng/ml of FGF2, 2 µM to 4 µM of CHIRR99021 and DMEM/F-12.

In addition, the differentiation medium refers to a culture medium capable of differentiating into a mesodermal-induced cell vascular endothelial cell lineage and may include 4 ng/ml to 6 ng/ml of FGF2, 5 ng/ml to 10 ng/ml of EGF, and 10 ng/ml to 30 ng/ml of VEGF-A, 20 ng/ml to 30 ng/ml of DLL4 and DMEM/F-12.

In addition, the maintenance medium refers to a culture medium capable of maintaining and proliferating differentiated vascular endothelial cells and may include 4 ng/ml to 6 ng/ml of FGF2, 5 ng/ml to 10 ng/ml of EGF, and 10 ng/ml to 30 ng/ml of VEGF-A, 20 ng/ml to 50 ng/ml of ascorbic acid and DMEM/F-12.

Here, DMEM/F-12 is the basal medium.

According to still another feature of the present invention, the culture step of the present invention may have a different culturing period depending on the stage. More specifically, the first culture step is a step in which human pluripotent stem cells are differentiated into mesoderm cells in the induction medium, and the medium is replaced every day and may have a culture period of 3 days. Furthermore, the second culture step is a step in which the mesoderm-induced cells are differentiated into endothelial cells, and the medium is replaced every day, and the culture period may have a culture period of 11 days to 13 days.

Meanwhile, as used herein the term "plate" is a vessel in which cell culture, that is, growth and proliferation, may be made, the upper surface may include a coating film of a matrix to which cells may adhere. Here, the coating film may include a coating film made of at least one of collagen, fibronectin, laminin, laminin fragments, vitronectin, basement membrane matrix, gelatin, hyaluronic acid, polylysine and vitronectin and may include 1 mg/ml or less, preferably 0.1 mg/ml of collagen.

Accordingly, differentiated cells are cultured on a plate coated with a coating film containing 1 mg/ml or less or 0.1 mg/ml of collagen, and only cells of the vascular endothelial cell lineage specifically adhered to the coating film can be selected by natural selection.

According to still another feature of the present invention, the passage culture is performed for the proliferation of endothelial cells, and passage culture may be performed from passage 1 to passage 4.

As used herein, the term "passage culture" means a method of culturing successive generations of cells while a portion of cells is periodically transferred to a new culture plate, and the culture medium is replaced with a fresh culture for the long-term culture of healthy cells. As the number of cells increases in the limited space of the culture plate, after a certain period of time, nutrients for growth are consumed or contaminants accumulate, causing the cells to die naturally. Thus, the passage culture is used to increase the number of healthy cells. Typically, passage 1 means culture by one replacement of medium (culture plate) or one dividing of cell population. The subculture methods known in the art may be used without limitation, but an enzymatic division method may be preferably performed.

According to an example of the present invention, provided is a medium for maintaining vascular endothelial cell characteristics, the medium including 4 ng/ml to 6 ng/ml of FGF2, 5 ng/ml to 10 ng/ml of EGF, 10 ng/ml to 30 ng/ml of VEGF-A, 20 ng/ml to 50 ng/ml of ascorbic acid and DMEM/F-12 as an active ingredient.

Further, according to an example of the present invention, provided is a method of maintaining vascular endothelial cell characteristics, the method including: seeding step to suspend cell separated as the vascular endothelial cell line with a maintenance medium containing 4 ng/ml to 6 ng/ml of FGF2, 5 ng/ml to 10 ng/ml of EGF, 10 ng/ml to 30 ng/ml of VEGF-A and 20 ng/ml to 50 ng/ml of ascorbic acid, and DMEM/F-12 as an active ingredient and to seed the suspension on a plate; and passage culture step to culture the seeded vascular endothelial cells in the maintenance medium so as to maintain the vascular endothelial cell characteristic.

In this case, the vascular endothelial cells differentiated from human pluripotent stem cells may have genes and proteins specifically expressed therein at high levels. For example, the expression levels of CDH5, PECAM1 and VWF genes in vascular endothelial cells differentiated from human pluripotent stem cells may be higher than in other cell lines differentiated from human pluripotent stem cells. Accordingly, genes and proteins specifically expressed at high levels in vascular endothelial cells differentiated from human pluripotent stem cells can be used as markers indicating the characteristics of vascular endothelial cells. Therefore, the identification of the above-mentioned markers may allow confirmation of the problem of the deterioration of vascular endothelial cells that may be caused by repeated culture and separation of the vascular endothelial cells with high purity among various differentiated cell lines.

Accordingly, according to still another feature of the present invention, the expression of CDH5-positive cells, which is a specific expression marker of the aforementioned vascular endothelial cells can be maintained at 98% or more until passage 4 in the vascular endothelial cells passage cultured by the above-described method.

Further, according to still another feature of the present invention, the expression of PECAM1-positive cells, which is a specific expression marker of the aforementioned vascular endothelial cells can be maintained at 40% or more until passage 4 in the vascular endothelial cells passage cultured by the above-described method.

Furthermore, according to still another feature of the present invention, the expression of VWF-positive cells, which is a specific expression marker of the aforementioned vascular endothelial cells can be maintained at 88% or more until passage 4 in the vascular endothelial cells passage cultured by the above-described method.

According to still another feature of the present invention, the plate may include a coating film consisting of at least one of collagen, fibronectin, laminin, laminin fragment, vitronectin, basement membrane matrix, gelatin, hyaluronic acid, polylysine and vitronectin, and may include 1 mg/ml or less, preferably 0.1 mg/ml of collagen.

In addition, according to still another feature of the present invention, the passage culture of the above-described method may be performed up to passages 1 to 4.

According to an example of the present invention, vascular endothelial cells prepared by the above-described method may be provided. Such vascular endothelial cells may have the angiogenic and regenerative ability, and thus may be used as a cell therapeutic agent for the prevention or treatment of cardiovascular diseases.

Hereinafter, the present invention will be described in more detail through examples. However, since these examples are only for illustrative purposes of the present invention, the scope of the present invention should not be construed as being limited by these examples.

Effects of the Invention

The present invention provides high-purity vascular endothelial cells based on matrix adhesion expressed according to the characteristics of cells to have the effect of stably applying the same in clinical practice.

More specifically, the present invention can separate only vascular endothelial cells differentiated and adhered within a specific time by using interaction, that is, the adhesion force between an adhesion protein specifically expressed in vascular endothelial cells and a matrix. Furthermore, the vascular endothelial cells separated by the above-described method express 98% or more of CDH5 and VWF, which are markers specifically expressed in vascular endothelial cells, thereby providing high-purity vascular endothelial cells with a purity of 98% or more.

In addition, the present invention is a method for separating high-purity vascular endothelial cells through a culturing process in a culture vessel and may be relatively simpler and more economical than conventional methods such as magnetic cell sorting and flow cytometry.

In addition, in the passage culture of vascular endothelial cells for mass production of vascular endothelial cells, high-purity vascular endothelial cells can be provided in high yield within a short time.

Furthermore, the present invention promotes angiogenesis and provides vascular endothelial cells with excellent vascular regeneration ability, thereby having an effect that can be utilized as an effective cell therapeutic agent for the prevention or treatment of cardiovascular diseases.

The present invention provides vascular endothelial cells that do not induce an immune response generated by using animal-derived serum or feeder cells, a maintenance medium of vascular endothelial cell characteristics capable of proliferating and culturing the vascular endothelial cells with high purity, and a culture method including the same, thereby having the effect of being stably applied to clinical practice.

Specifically, the present invention provides an induction, differentiation and maintenance medium specialized for each stage in the culture of human pluripotent stem cells into vascular endothelial cells, thereby increasing the yield of differentiated cells and providing high-purity vascular endothelial cells.

In addition, provided is a maintenance medium specialized for passage culture of vascular endothelial cells for mass production of vascular endothelial cells to provide high-purity vascular endothelial cells within a short time.

The effect according to the present invention is not limited by the contents exemplified above, and more various effects are included in the present specification.

BEST MODES FOR CARRYING OUT THE INVENTION

Advantages and features of the present invention and methods of achieving the same become apparent with reference to the examples described below in detail in conjunction with the accompanying drawings. However, the present invention is not limited to the examples disclosed below, but is embodied in various different forms, and only these examples allow the disclosure of the present invention to be complete and are provided to fully inform those of ordinary skill in the art to which the present invention belongs, the scope of the invention. The present invention is only defined by the scope of the claims. As used herein, the term "differentiation" means that cells develop at the level of a composite or individual of a specific cell or tissue having a specific function.

As used herein, the term "proliferation" refers to an increase in the number of cells and is used in the same sense as growth.

As used herein, the term "renewal ability" may mean the ability of a cell to make an exact copy of itself, and when the regenerative ability is improved, the cell's proliferative ability may be excellent.

Method of Separating Pure Vascular Endothelial Cells

Hereinafter, with reference to FIGS. 1 to 3D, a method for separating pure vascular endothelial cells according to an example of the present invention is described in detail.

Figure 1:
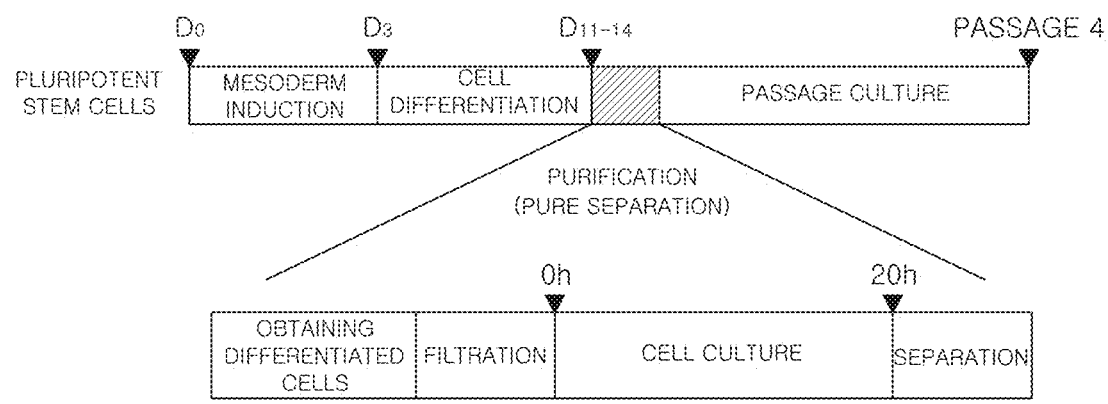
FIG. 1 illustrates the procedure of the culture method of pure vascular endothelial cells.
Figure 2:
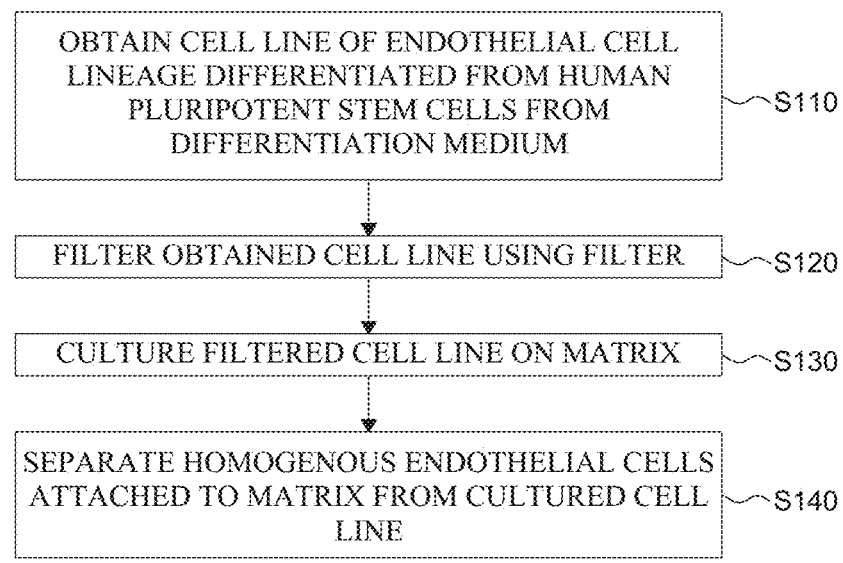
FIG. 2 illustrates the procedure of the method of separating pure vascular endothelial cells according to an example of the present invention.
Figure 3A:
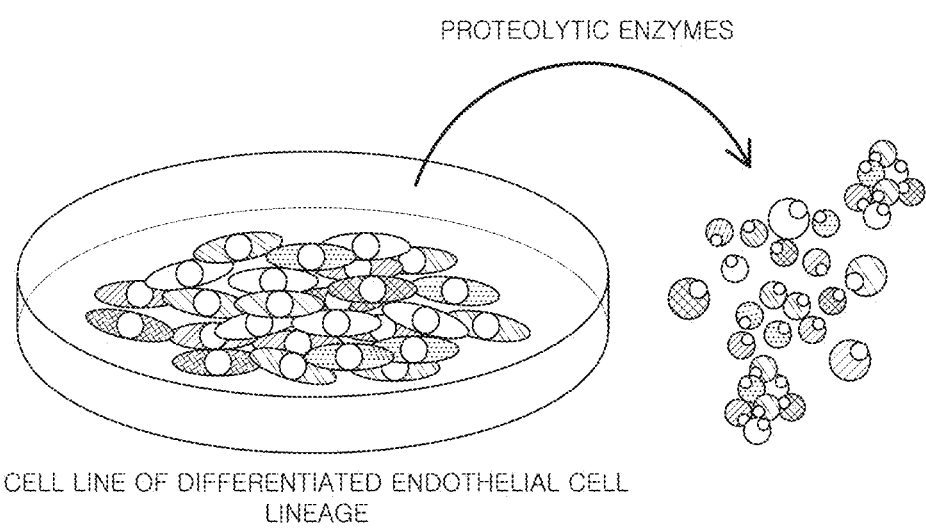
FIGS. 3A to 3D illustrate the process of separating, as pure vascular endothelial cells, endothelial cells differentiated from human pluripotent stem cells.
Figure 3B:
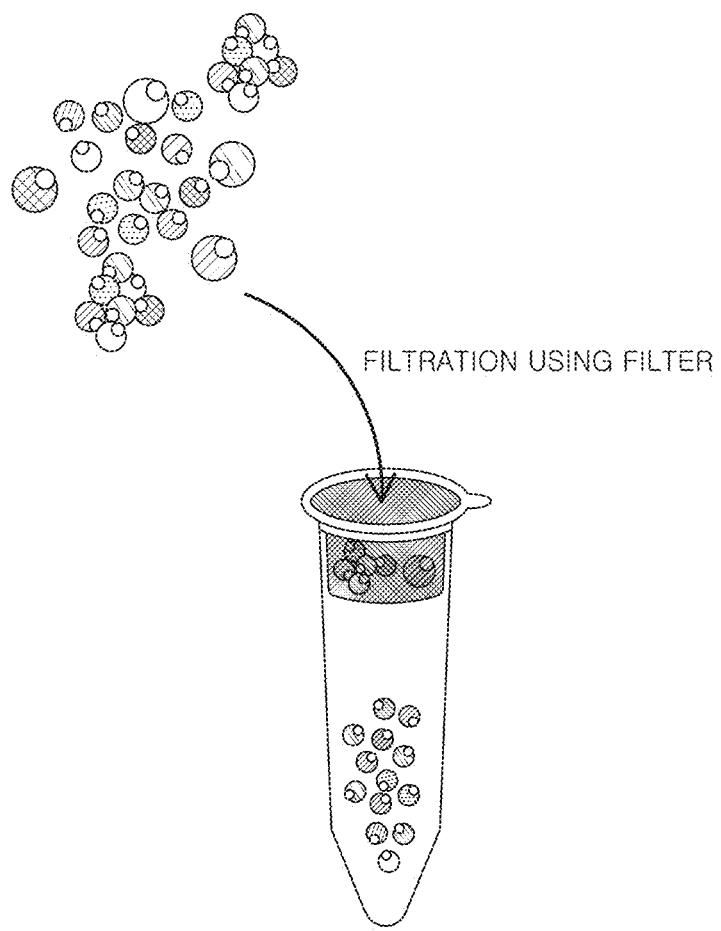
Figure 3C:
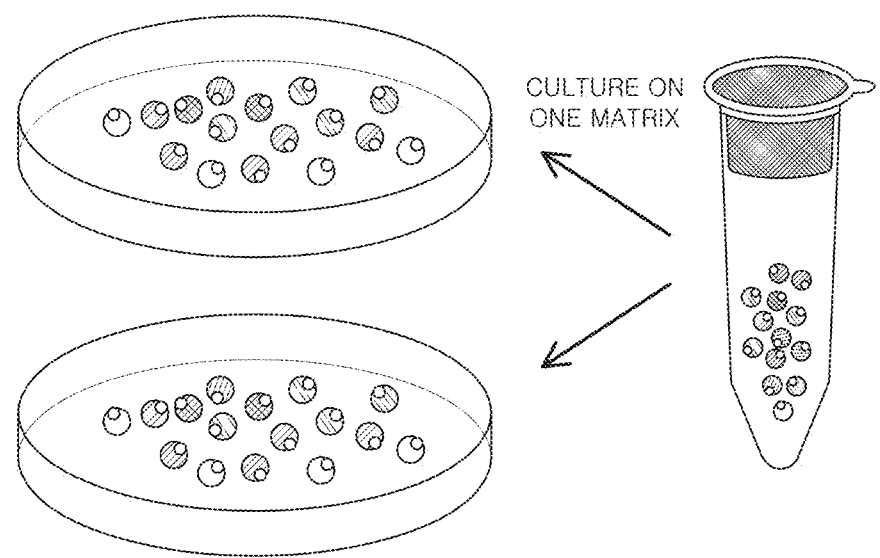
Figure 3D:
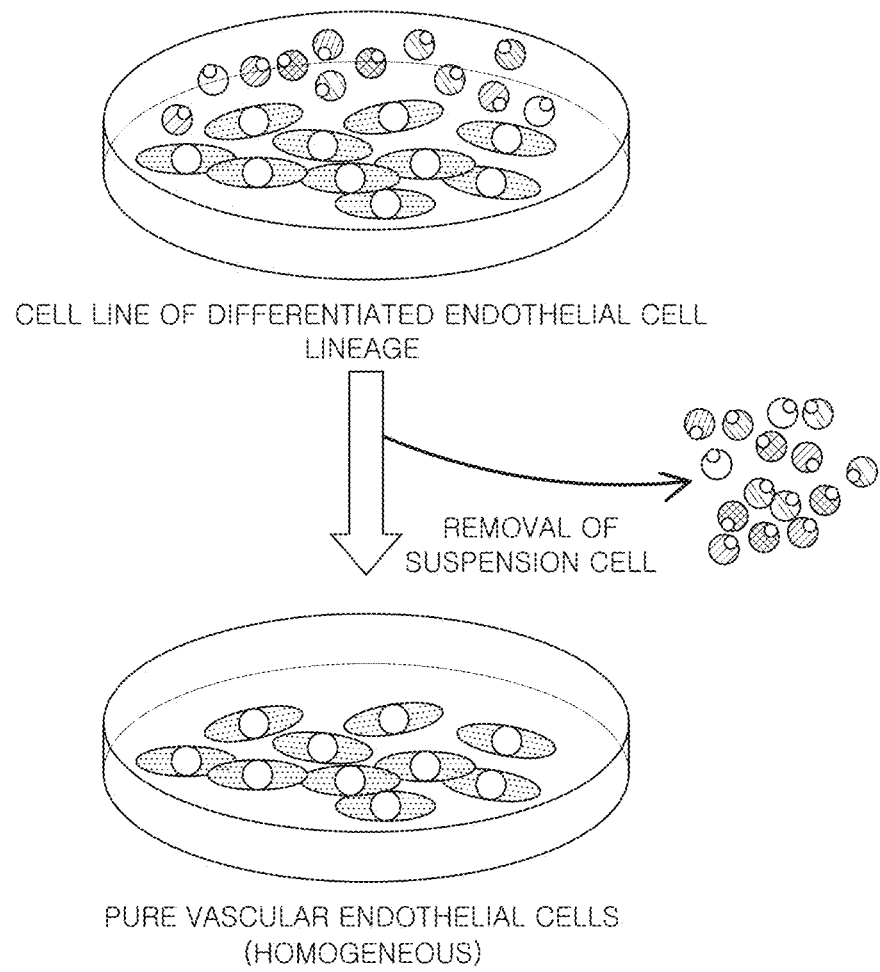

FIG. 1 illustrates the procedure of the culture method of pure vascular endothelial cells. Hereinafter, for convenience of description, it will be described with reference to FIGS. 2 to 3D.

Referring to FIG. 1, first, pluripotent stem cells are suspended in an induction medium, and the suspension is seeded on a plate. The induction medium is replaced every day for 3 days, and the cells may be induced to differentiate into cells of the mesodermal lineage. In this case, the induction medium may be a DMEM/F-12 medium containing a growth factor and CHIRR99021, a GSK3β inhibitor. Here, the growth factor may include at least one of fibroblast growth factor-1 (FGF-1), FGF-2 (bFGF), FGF-3, FGF-4, FGF-5, FGF-6, epidermal growth factor (EGF), keratinocyte growth factor (KGF), hepatocyte growth factor (HGF), transforming growth factor-α (TGF-α), TGF-β, angiopoietin 1, angiopoietin 2, erythropoietin, neuropilin, IGF-1, osteopoline, pleiotrophin, activin, endothelin 01 and vascular endothelial growth factor-A (VEGF-A), but is not limited thereto. Furthermore, CHIRR99021 is a substance that inhibits the activity of glycogen synthase kinase (GSK). More specifically, GSK is inhibited so that the β of the signaling system involved in cell proliferation is not degraded by GSK, and thus the expression level of genes involved in cell proliferation is increased, thereby improving cell survival and proliferation.

Then, the cells of the mesoderm lineage may be differentiated into cell lines of the endothelial cell lineage in the differentiation medium by changing the differentiation medium every day for 11 days to 14 days. In this case, the differentiation medium may be a DMEM/F-12 medium containing a growth factor and DLL4, a Notch signaling ligand. Here, delta-like ligand 4 (DLL4) is a signaling substance in the process of angiogenesis and may be associated with an increase in the expression level of endothelial cell markers.

Then, homogenous endothelial cells may be isolated from the cell line of the differentiated endothelial cell lineage by using the method of separating pure vascular endothelial cells according to an example of the present invention. More specifically, referring to FIG. 2, a procedure of a method of separating pure vascular endothelial cells according to an example of the present invention is illustrated. The method of separating pure vascular endothelial cells is a method for selecting high-purity vascular endothelial cell and may include steps of obtaining a cell line of an endothelial cell lineage differentiated from human pluripotent stem cells from a differentiation medium (S110), filtering the obtained cell line using a filter (S120), culturing the filtered cell line on a matrix (S130), and separating homogenous endothelial cells attached to the matrix from the cultured cell line (S140).

First, in step of obtaining a cell line of an endothelial cell lineage differentiated from human pluripotent stem cells from a differentiation medium (S110), a proteolytic enzyme method may be used to obtain a cell line of the endothelial cell lineage differentiated from the differentiation medium. More specifically, referring to FIG. 3A, the proteolytic enzyme method is a method of separating cells and cells or cells and matrix by using a proteolytic enzyme. A degrading enzyme substance may include collagenase, dispase, protease, trypsin, and the like, but is not limited thereto. Accordingly, the cell line of the endothelial cell lineage may be separated into each single cell from the linkage between the matrix and cells. Furthermore, in the method of separating pure vascular endothelial cells according to an example of the present invention, target cells may be separated from the matrix by using the above-described proteolytic enzyme method.

Next, in step of filtering the obtained cell line using a filter (S120), a filter may be used to have a pore spacing in the range of 20 μm to 40 μm, thereby separating cells of a certain size. More specifically, referring to FIG. 3B, the filter is used to remove other cells, impurities, and cell clumps having different morphological sizes from the target cells and to separate only cells of the same morphological size. Thereby, cells of higher homogeneity may be obtained. At this time, the cell clump refers to a mass formed by aggregation of cells. When a cell clump is formed, cell cycle arrest occurs, and thus self-differentiation is induced. Thus, it is difficult to differentiate into a desired cell, that is, a vascular endothelial cell.

Then, in step of culturing the filtered cell line on the matrix (S130), the cell line may be divided and seeded on the matrix. More specifically, referring to FIG. 3C, a cell line of an endothelial cell lineage obtained from one plate containing a matrix is filtered using a filter, and the filtered cell line is divided, seeded, and cultured into two matrices. In this case, if the cell line is divided and cultured in more than two matrices, the selection yield of vascular endothelial cells may decrease, and thus the proliferation efficiency and characteristic maintenance of vascular endothelial cells may decrease during passage culture.

Figure 4:
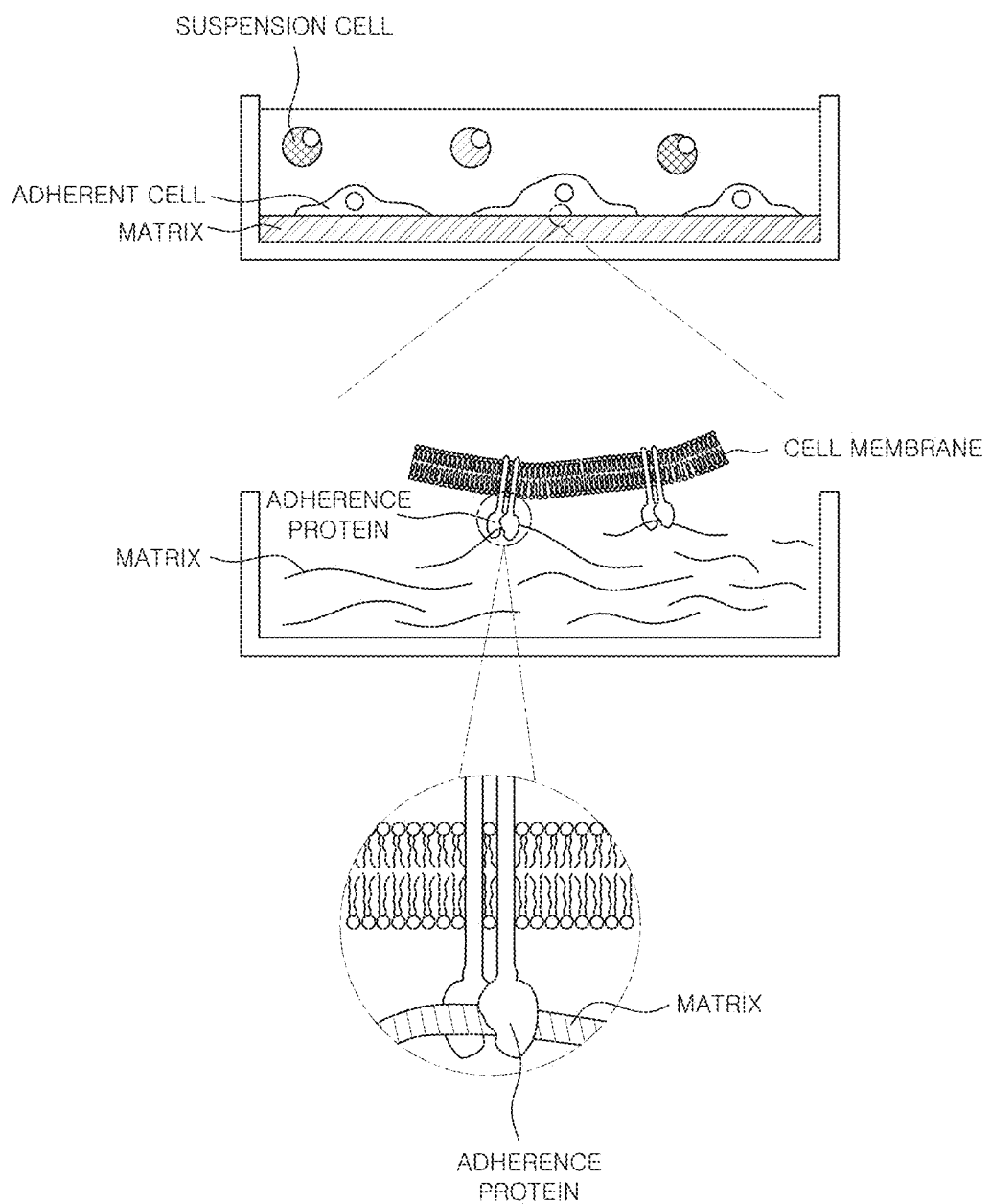
FIG. 4 illustrates the matrix adhesion mechanism of vascular endothelial cells.

In addition, in step of culturing the filtered cell line on the matrix (S130), it may be cultured for 4 hours to 20 hours. More specifically, referring to FIG. 4, the matrix adhesion mechanism of vascular endothelial cells is illustrated. Cells may interact with functionalized regions of matrix surfaces using adhesion proteins such as integrins. In this case, the adhesion protein may have different expression patterns depending on the characteristics and types of cells that are generated while the cells are differentiated. The adhesion affinity to the matrix may be determined depending on the difference in the adhesion proteins, and further, due to the adhesion affinity according to the characteristics and types of cells, the interaction, i.e., adhesion, to the matrix may be caused at different times. In addition, characteristics and types of cells may be distinguished through markers, and markers that may identify vascular endothelial cells may include CDH5, VWF, PECAM1, TEK and KDR, but preferably CDH5 and VWF.

Accordingly, vascular endothelial cells expressing CDH5 and VWF markers may adhere to a matrix containing 0.1 mg/ml collagen for 4 hours to 20 hours, and when culture is performed for more than 20 hours, a different type of cells having an expression pattern of the marker other than the vascular endothelial cell expressing CDH5 and VWF markers may adhere. Accordingly, the culturing step for the method of separating pure vascular endothelial cells according to an example of the present invention may be performed for 4 hours to 20 hours but is not limited thereto. The culture time may be adjusted according to the type of matrix.

Furthermore, the matrix used in step of culturing the filtered cell line on a matrix (S130) may include at least one of collagen, fibrin, fibronectin, vitronectin, Matrigel™, gelatin, laminin, heparin, polylysine, and hyaluronic acid. However, it may contain 1 mg/ml or less, preferably 0.1 mg/ml of collagen. However, the matrix is not limited thereto, and any material to which vascular endothelial cells may be selectively attached may be used without limitation.

Furthermore, in step of culturing the filtered cell line on a matrix (S130), the cell line of the filtered endothelial cell lineage may be cultured in DMEM/F-12 medium containing cell growth factors and ascorbic acid. In this case, the growth factor refers to a substance that may promote cell division, cell growth and differentiation, and may include at least one of fibroblast growth factor-1 (FGF-1), FGF-2 (bFGF), FGF-3, FGF-4, FGF-5, FGF-6, epidermal growth factor (EGF), keratinocyte growth factor (KGF), hepatocyte growth factor (HGF), transforming growth factor-α (TGF-α), TGF-β, angiopoietin 1, angiopoietin 2, erythropoietin, neuropilin, IGF-1, osteopoline, pleiotrophin, activin, endothelin 01 and vascular endothelial growth factor-A (VEGF-A), but is not limited thereto.

Furthermore, in the culture environment conditions, the temperature may be 36° C. to 38° C., preferably 36.5° C. to 37.5° C., the supply oxygen ($O_2$) may be 1% to 25%, and the supply carbon dioxide ($CO_2$) may be 1% to 15%

Next, in step of separating homogenous endothelial cells attached to the matrix from the cultured cell line (S140), high-purity vascular endothelium containing 98% or more of expression positive cells for a marker specifically expressed in vascular endothelial cells may be isolated. More specifically, referring to FIG. 3D, first, cells that did not adhere for 4 hours to 20 hours are removed, and only cells that adhere to the matrix for 4 hours to 20 hours may be separated. At this time, the cells adhered to the matrix for 4 hours to 20 hours are homogeneous cells with the same morphological shape and marker expression pattern, and the number of positive cells expressing specific CDH5 and VWF markers may be 98% or more in vascular endothelial cells. That is, endothelial cells having a purity of 98% or more may be obtained.

Furthermore, the expression level of markers for vascular endothelial cells may be increased by the method of separating pure vascular endothelial cells according to an example of the present invention. More specifically, the gene expression level of CDH5, which is a specific marker for vascular endothelial cells, may be 12 times higher than before separation by the method of separating pure vascular endothelial cells. In addition, the gene expression level of VWF, which is a specific marker for vascular endothelial cells, may be twice as high as before separation by the method of separating pure vascular endothelial cells.

Again, referring to FIG. 1, the homogeneous endothelial cells isolated by the method of separating pure vascular endothelial cells according to an example of the present invention may be passage cultured to increase the number of cells and maintain the cells. In this case, the medium used in the passage culture may be the same as the medium used in the pure separation step, which may be DMEM/F-12 medium containing cell growth factors and ascorbic acid. In addition, passage culture may be performed in passages 1 to 4. More specifically, when culturing of vascular endothelial cells for more than passages 4, proliferative and differentiation capacity is reduced. Further, when cultured for a long period of time, cell clumps, etc., may be formed and chromosomal mutations may be accompanied. Therefore, passage culture capable of securing a large number of cells with high purity while maintaining the characteristics of vascular endothelial cells may preferably be passages 1 to 4.

There is an effect of producing high-purity vascular endothelial cells having homogeneous characteristics from human pluripotent stem cells in high yield by the method of separating pure vascular endothelial cells according to an example of the present invention.

Confirmation of the Filter Effect in the Method of Separating Pure Vascular Endothelial Cells According to an Example of the Present Invention Hereinafter, the effect of the filter in the method of separating pure vascular endothelial cells according to an example of the present invention is described in detail with reference to FIGS. 5A to 5B.

Figure 5A:
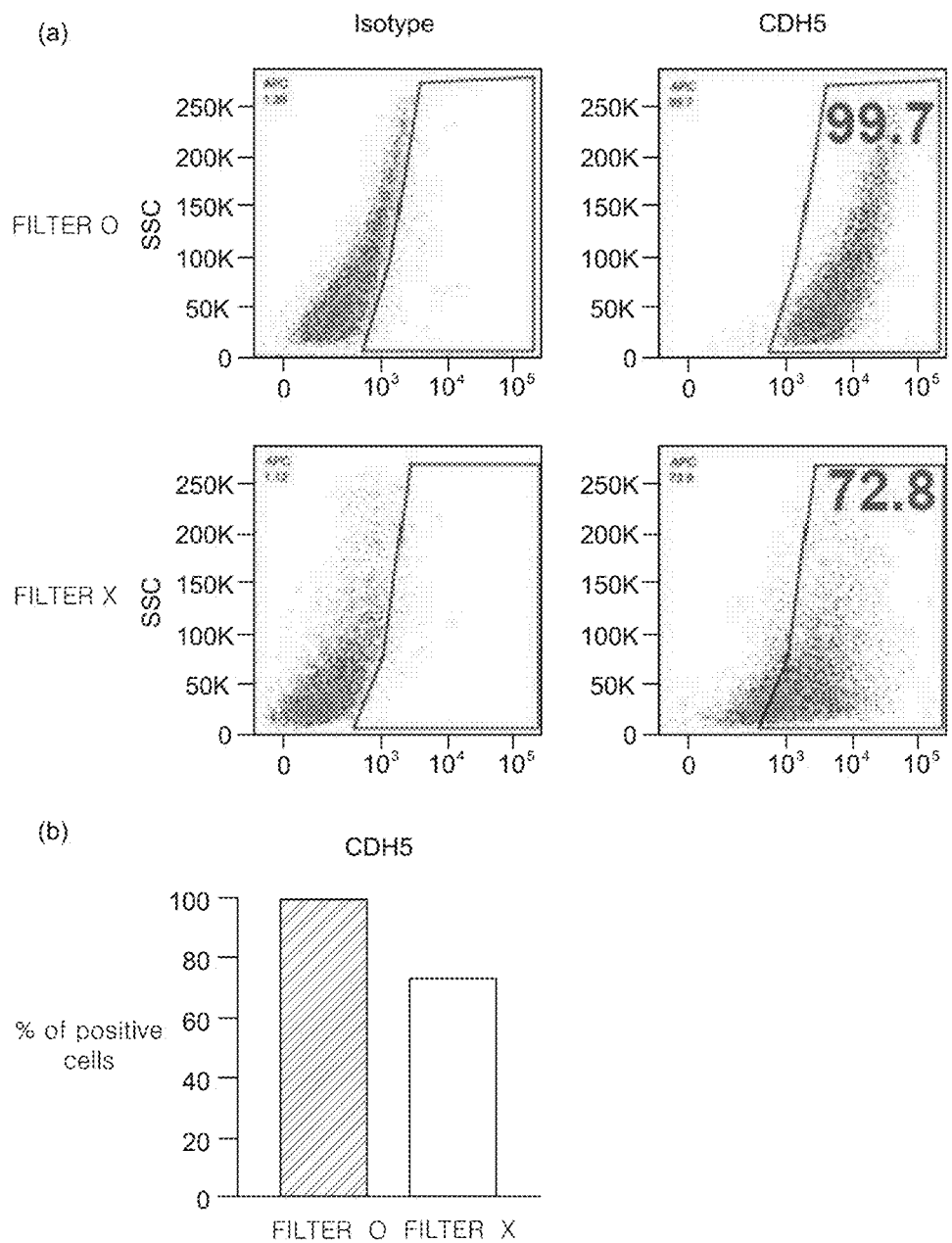
FIGS. 5A and 5B illustrate the results of marker expression and microscopic images according to whether or not a filter is used in the method of separating pure vascular endothelial cells according to an example of the present invention.
Figure 5B:
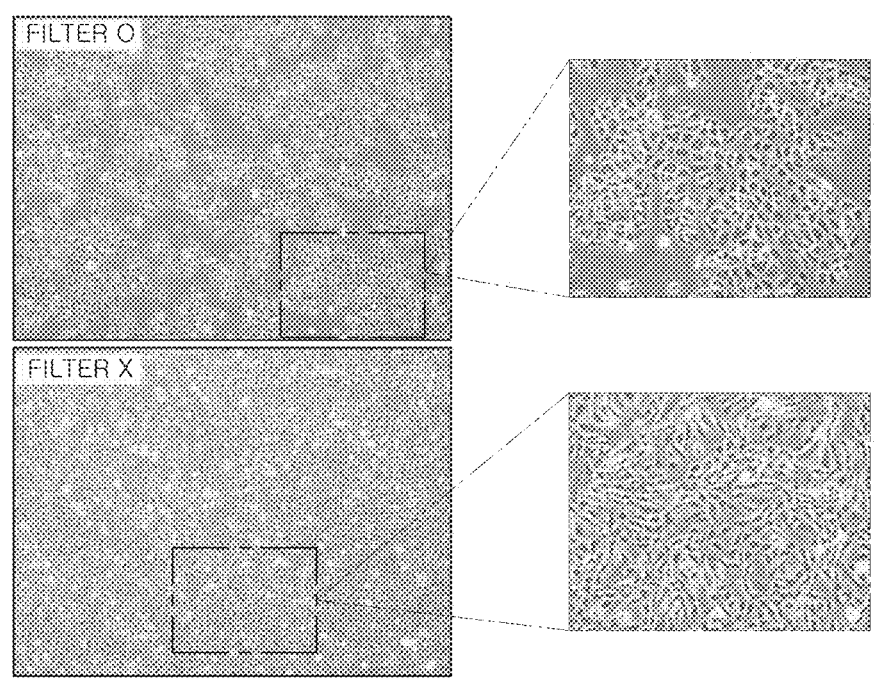

FIGS. 5A and 5B illustrate the results of marker expression and microscopic images according to whether or not a filter is used in the method of separating pure vascular endothelial cells according to an example of the present invention.

Referring to FIG. 5A, the expression level results of positive vascular endothelial cells for markers depending on whether or not a filter is used in the method of separating pure vascular endothelial cells according to an example of the present invention are shown. In this case, vascular endothelial cells depending on whether or not a filter is used may be tested together with an isotype control. The isotype control is a control in which a sample is reacted with an immunoglobulin of the same type without antigen specificity, which may be set as a cut-off for the positivity of vascular endothelial cells by making the positive ratio less than 2% in the isotype control.

First, referring to FIG. 5A (a), when no filter is used, the positive expression level of vascular endothelial cells for the CDH5 marker is 72.8%. Furthermore, when the filter was used, the positive expression level of vascular endothelial cells for the CDH5 marker is 99.7%.

Furthermore, referring to FIG. 5A (b), a result graph showing the positive expression level of vascular endothelial cells for the marker according to the presence or absence of the filter as described above is illustrated. More specifically, it is shown that the number of positive cells expressing the CDH5 marker increased from 72.8% to 99.7% due to the use of the filter. This may mean that the number of positive cells expressing the CDH5 marker may be increased due to the use of the filter.

Furthermore, referring to FIG. 5B, results of a microscope image according to whether or not a filter is used in the method of separating pure vascular endothelial cells according to an example of the present invention are shown. More specifically, when no filter is used, the observed cell colonies is shown to consist of morphologically non-uniform cells. On the other hand, when a filter is used, the cell colonies are shown to consist of morphologically uniformly shaped cells. This may mean that only cells having the same morphological characteristics may be separated due to the use of a filter.

As a result of the above, in the method of separating pure vascular endothelial cells according to an example of the present invention, the filter is used to increase the number of positive cells expressing CDH5, a specific marker for vascular endothelial cells and to separate cells having morphologically equivalent shape. Accordingly, the use of the filter causes an effect that may provide higher purity vascular endothelial cells.

Confirmation of Purity of Vascular Endothelial Cells Separated by the Method of Separating Pure Vascular Endothelial Cells According to an Example of the Present Invention Hereinafter, the confirmation of purity of vascular endothelial cells separated by the method of separating pure vascular endothelial cells according to an example of the present invention is described in detail with reference to FIGS. 6A to 6C and 7.

Figure 6A:
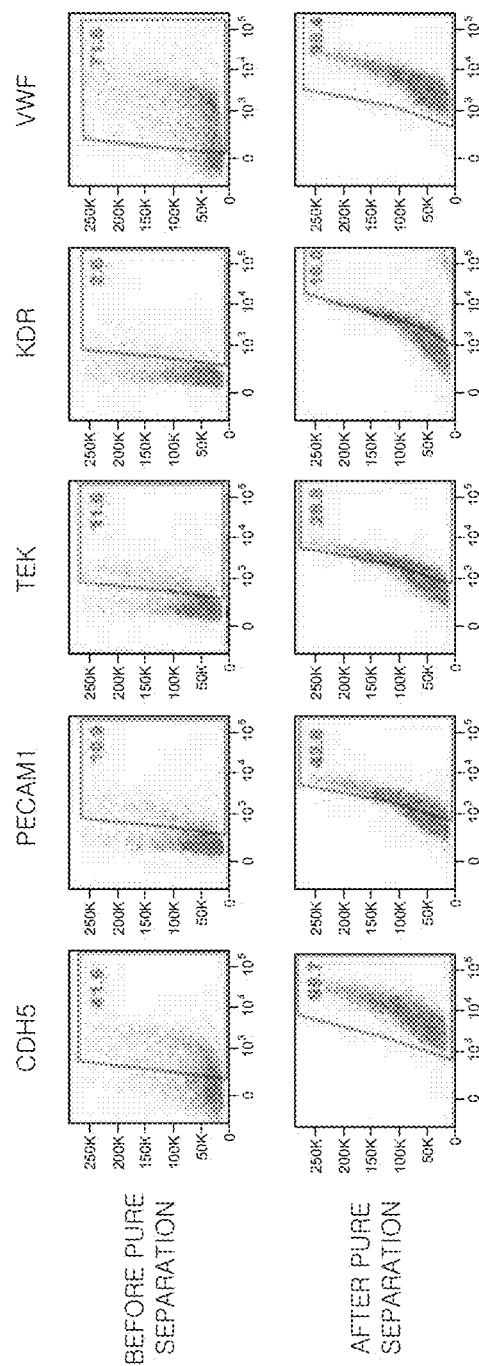
FIGS. 6A to 6C illustrate marker expression results of vascular endothelial cells separated by the method of separating pure vascular endothelial cells according to an example of the present invention.
Figure 6B:
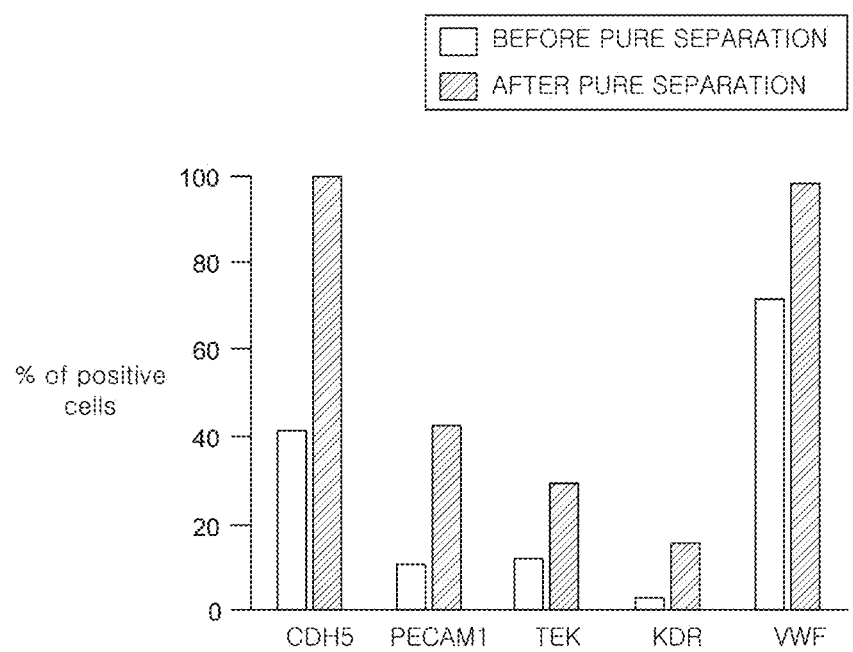
Figure 6C:
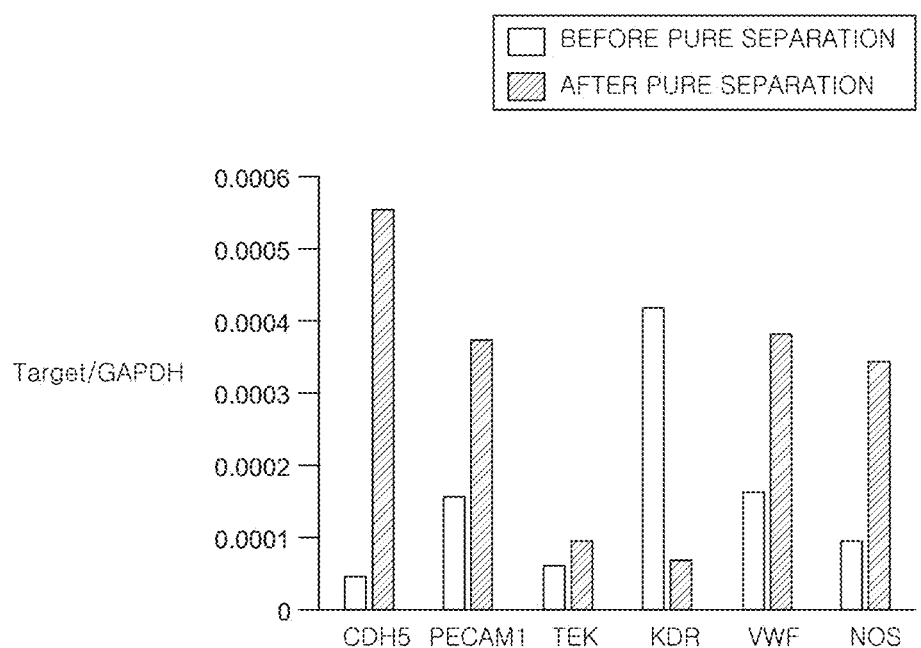

FIGS. 6A to 6C illustrate marker expression results of vascular endothelial cells separated by the method of separating pure vascular endothelial cells according to an example of the present invention.

First, referring to FIG. 6A, the expression level results of positive vascular endothelial cells for markers in the method of separating pure vascular endothelial cells according to an example of the present invention are shown. More specifically, when the pure separation of the present invention is not performed, the positive expression level of vascular endothelial cells for the CDH5 marker is 41.6%, and when the pure separation is performed, the level is 99.7%.

In addition, when the pure separation of the present invention is not performed, the positive expression level of vascular endothelial cells for the PECAM1 marker is 16.9%, and when the pure separation is performed, the level is 42.6%.

In addition, when the pure separation of the present invention is not performed, the positive expression level of vascular endothelial cells for the TEK marker is 11.6%, and when the pure separation is performed, the level is 28.8%.

In addition, when the pure separation of the present invention is not performed, the positive expression level of vascular endothelial cells for the KDR marker is 2.6%, and when the pure separation is performed, the level is 16.0%.

In addition, when the pure separation of the present invention is not performed, the positive expression level of vascular endothelial cells for the VWF marker is 71.6%, and when the pure separation is performed, the level is 98.4%.

Furthermore, referring to FIG. 6B, a graph showing the expression level of positive vascular endothelial cells for markers in the above-described method of separating pure vascular endothelial cells is shown. More specifically, in all of the CDH5, PECAM1, TEK, KDR and VWF markers, which are characteristic indicators of vascular endothelial cells, the number of marker-expressing positive cells is increased by the pure separation. In particular, the number of marker-expressing positive cells for CDH5 and VWF is 98% or more, indicating that the purity of vascular endothelial cells is 98% or more.

Furthermore, referring to FIG. 6C, mRNA expression levels of vascular endothelial cells for markers according to the method of separating pure vascular endothelial cells according to an example of the present invention are shown. At this time, the expression level of the markers is normalized using GAPDH. More specifically, the mRNA expression levels of vascular endothelial cells for CDH5, PECAM1, TEK, VWF and NOS markers are shown to be increased by pure separation. Furthermore, the gene expression for the CDH5 marker, which is characteristically expressed in vascular endothelial cells with 98% purity, by pure separation, is shown to be 12 times higher than that before pure separation.

In addition, the gene expression for the VWF marker, which is characteristically expressed in vascular endothelial cells with 98% purity, by pure separation, is shown to be twice higher than before pure separation.

Meanwhile, the mRNA expression level of vascular endothelial cells for the KDR marker is shown to be high than before pure separation. This KDR marker is expressed in the early stage of differentiation of vascular endothelial cells, and these characteristics are gradually lost when differentiated into mature vascular endothelial cells. Meanwhile, VWF marker is a substance which is not expressed in the early stage of differentiation but is expressed in the process of differentiation into mature vascular endothelial cells. Accordingly, an endothelial cell colony with a high mRNA expression level for KDR before pure separation may mean that undifferentiated vascular endothelial cells are included. Furthermore, an endothelial cell colony with a high mRNA expression level for VWF after pure separation may mean that fully differentiated and mature vascular endothelial cells are included.

Figure 7:
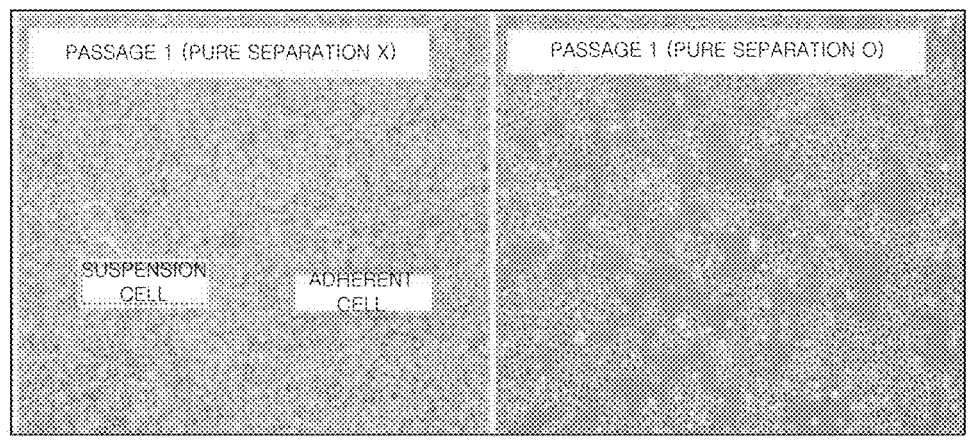
FIG. 7 illustrates the results of microscopic images on passage culture according to the method of separating pure vascular endothelial cells according to an example of the present invention.

For example, referring to FIG. 7, a microscopic image during passage culture according to the method of separating pure vascular endothelial cells according to an example of the present invention is shown. In the passage culture of vascular endothelial cells, in which the pure separation method has not been performed, adherent cells and suspension cells are shown to be mixed. More specifically, the vascular endothelial cells in the method of separating pure vascular endothelial cells according to an example of the present invention may be differentiated from human pluripotent stem cells.

At this time, since human pluripotent stem cells have the characteristics of stem cells, matrix adhesion may be significantly lower than that of other cells, and accordingly, they may be cultured in suspension. However, as stem cells are differentiated into vascular endothelial cells, they lose their characteristics of stem cells and may acquire matrix adhesion to vascular endothelial cells. Accordingly, suspension cells during passage culture still have the characteristics of stem cells with poor matrix adhesion and may mean that they are undifferentiated cells in the early stage of differentiation in which KDR markers are expressed. Furthermore, the adherent cells may refer to mature cells exhibiting the matrix adhesion characteristics of vascular endothelial cells.

Furthermore, when only mature vascular endothelial cells are separated by the method of separating pure vascular endothelial cells according to an example of the present invention and are passage cultured, it is shown that only adherent cells are present. This may mean that undifferentiated cells do not exist, only mature vascular endothelial cells are seeded, and they proliferate into high-purity vascular endothelial cells.

As a result of the above, it is confirmed that undifferentiated cells and cells having different characteristics are separated by the method of separating pure vascular endothelial cells according to an example of the present invention, thereby providing high-purity vascular endothelial cells during passage culture. Accordingly, it is possible to provide high-purity vascular endothelial cells in which expression of CDH5 and VWF markers, which are characteristically expressed in vascular endothelial cells, are 98% or more, that is, their purity is 98% or more.

Culture Method of Maintaining Vascular Endothelial Cell Characteristics

Hereinafter, a method of maintaining vascular endothelial cell characteristics according to an example of the present invention is described in detail with reference to FIGS. 8 to 10.

Figure 8:
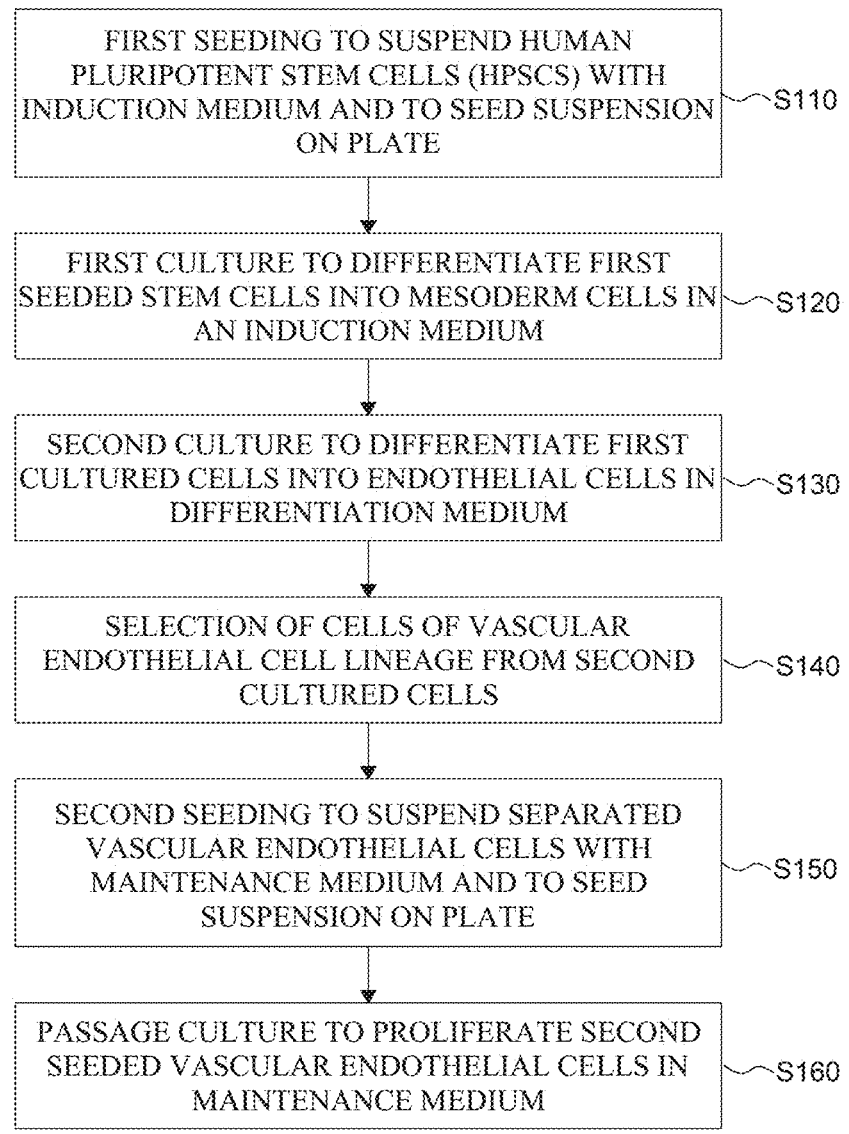
FIG. 8 illustrates the procedure of the culture method for maintaining vascular endothelial cell characteristics according to an example of the present invention.

FIG. 8 illustrates the procedure of the culture method of maintaining vascular endothelial cell characteristics according to an example of the present invention. Hereinafter, for convenience of description, it is described with reference to FIGS. 9A to 10.

Referring to FIG. 8, the culture method of maintaining vascular endothelial cell characteristics includes first seeding step to suspend human pluripotent stem cells (hPSCs) with an induction medium and to seed the suspension on a plate (S110), first culture step to differentiate the first seeded stem cells into mesoderm cells in an induction medium (S120), second culture step to differentiate the first cultured cells into endothelial cells in a differentiation medium (S130), selection step of cells of the vascular endothelial cell lineage from the second cultured cells (S140), second seeding step to suspend the selected vascular endothelial cells with a maintenance medium and to seed the suspension on a plate (S150) and passage culture step to proliferate the second seeded vascular endothelial cells in the maintenance medium (S160).

Here, in the culture environment conditions, the temperature may be 36° C. to 38° C., preferably 36.5° C. to 37.5° C., the supply oxygen ($O_2$) may be 1% to 25%, and the supply carbon dioxide ($CO_2$) may be 1% to 15%.

More specifically, first, in first seeding step to suspend human pluripotent stem cells with an induction medium and to seed the suspension on a plate (S110), the undifferentiated human pluripotent stem cells are separated from the tissue using a proteolytic enzyme and then suspended with the induction medium, and the suspension is seeded a plate coated with a coating film containing 0.1 mg/ml collagen.

Here, the proteolytic enzyme refers to an enzyme capable of isolating the intercellular matrix in order to liberate cells or cell aggregates contained in living tissues, and collagenase, dispase, protease, trypsin, etc. may be used in order to separate human pluripotent stem cells from tissues or cells and cell clumps but is not limited thereto.

Furthermore, the plate is not limited as long as cell culture may be performed, and may include various types of plate such as flasks, tissue culture flasks, dishes, Petri dishes, micro plates, micro well plates, micro slides, chamber slides, chalets, tubes, trays and culture bags, etc. It may include a cell adhesion layer coating film on the upper surface. More specifically, the coating film of the plate may include at least one of collagen, fibronectin, laminin, laminin fragment, vitronectin, basement membrane matrix, gelatin, hyaluronic acid, polylysine, and vitronecrin, and may include 1 mg/ml or less, preferably 0.1 mg/ml of collagen. Accordingly, cell adhesion and extension are promoted by culturing on a plate containing 0.1 mg/ml collagen coating film, thereby increasing the differentiation efficiency of cells of the mesodermal lineage.

Next, in the first culture step to differentiate the first seeded stem cells into mesoderm cells in an induction medium (S120), the culture is performed using an induction medium containing growth factors, 4 ng/ml to 6 ng/ml of FGF2, as a growth factor, 2 µM to 4 µM of CHIRR99021 as a GSK3β inhibitor and DMEM/F-12 while changing the medium daily for 3 days, thereby inducing differentiation from stem cells to mesodermal lineage cells.

In this case, Fibroblast growth factor (FGF2) is a growth factor involved in various biological processes such as promotion of division, including cell proliferation and cell differentiation, angiogenesis, bone morphogenesis, and nerve growth.

In addition, CHIRR99021 is a substance that inhibits the activity of glycogen synthase kinase (GSK). More specifically, as GSK is inhibited, β of the signaling system involved in cell proliferation is not degraded by GSK, and thus the expression level of genes involved in cell proliferation is increased, thereby improving cell survival and proliferation.

Next, in the second culture step to differentiate the first cultured cells into endothelial cells in a differentiation medium (S130), the culture is performed using a differentiation medium containing growth factors, 4 ng/ml to 6 ng/ml FGF2, 5 ng/ml to 10 ng/ml of EGF, 10 ng/ml to 30 ng/ml of VEGF-A, 20 ng/ml to 30 ng/ml DLL4, as Notch signaling ligand and DMEM/F-12 while changing the medium daily for 11 days to 13 days, thereby inducing differentiation from cells of the mesodermal lineage to the endothelial lineage. Further, in the second culture step to differentiate the first cultured cells into endothelial cells in a differentiation medium (S130), heparin is selectively used to increase the efficiency of differentiation into endothelial cell lineages.

Here, epidermal growth factor (EGF) is a growth factor capable of promoting cell proliferation, growth, and differentiation by binding to its receptor, and may have an activity to promote proliferation of epithelial cells.

In addition, vascular endothelial growth factor (VEGF-A) is a signaling substance involved in the formation of the embryonic circulation and vasculogenesis by activating VEGF signaling and may stimulate cell division and cell migration of endothelial cells.

In addition, delta-like ligand 4 (DLL4) is a signaling substance that affect the Notch receptor which reduces endothelial cell growth and migration, determination of arterial and venous differentiation, determination of tip and stack cell crystallization, and tip cell formation to inhibit excessive angiogenesis, thereby properly regulates angiogenic sprouting. In particular, it is determined that DLL4 is added to regulate the Notch signal, which acts to distinguish and maintain the characteristics of cells to increase the characteristics of vascular endothelial cells, that is, the expression level of markers.

Next, in step of selecting the second cultured cells as cells of the vascular endothelial cell line (S140), various cell lines differentiated from stem cells, that is, vascular endothelial cells from the endothelial cell lineage, are selected to obtain high-purity vascular endothelial cells. More specifically, a process for selecting pure vascular endothelial cells is described with reference to FIGS. 9A to 9D.

Figure 9A:
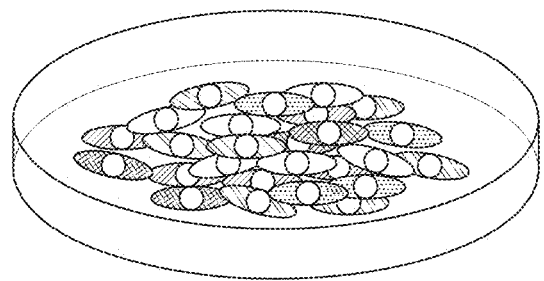
FIGS. 9A to 9D illustrate the process of selecting, as pure vascular endothelial cells, endothelial cells differentiated from human pluripotent stem cells.
Figure 9A:
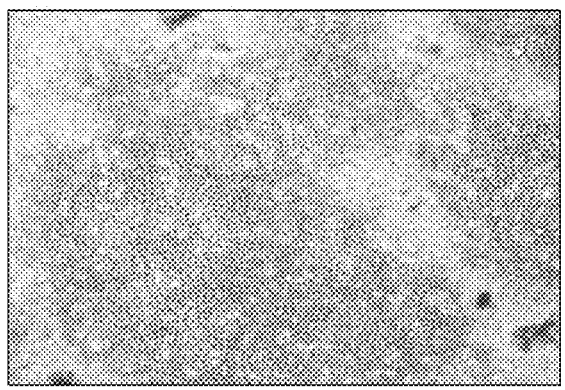
Figure 10:
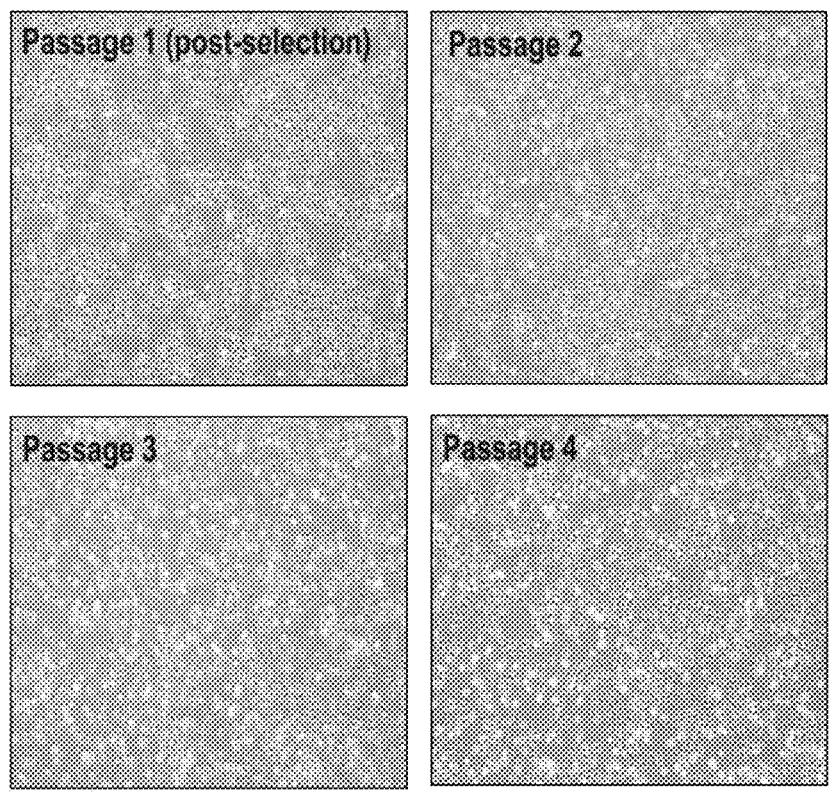
FIG. 10 illustrates the result of the microscopic images of vascular endothelial cells according to the number of passage cultures in the culture method of maintaining vascular endothelial cell characteristics according to an example of the present invention.

First, referring to FIG. 9A (a), a colony composed of an endothelial cell lineage is shown. Endothelial cells differentiated from human pluripotent stem cells autonomously differentiate to form colonies composed of heterogeneous endothelial cell lineages. Accordingly, referring to FIG. 9A (b), it is shown that the differentiated endothelial cell lineages are mixed in various types in terms of size and shape.

Figure 9B:
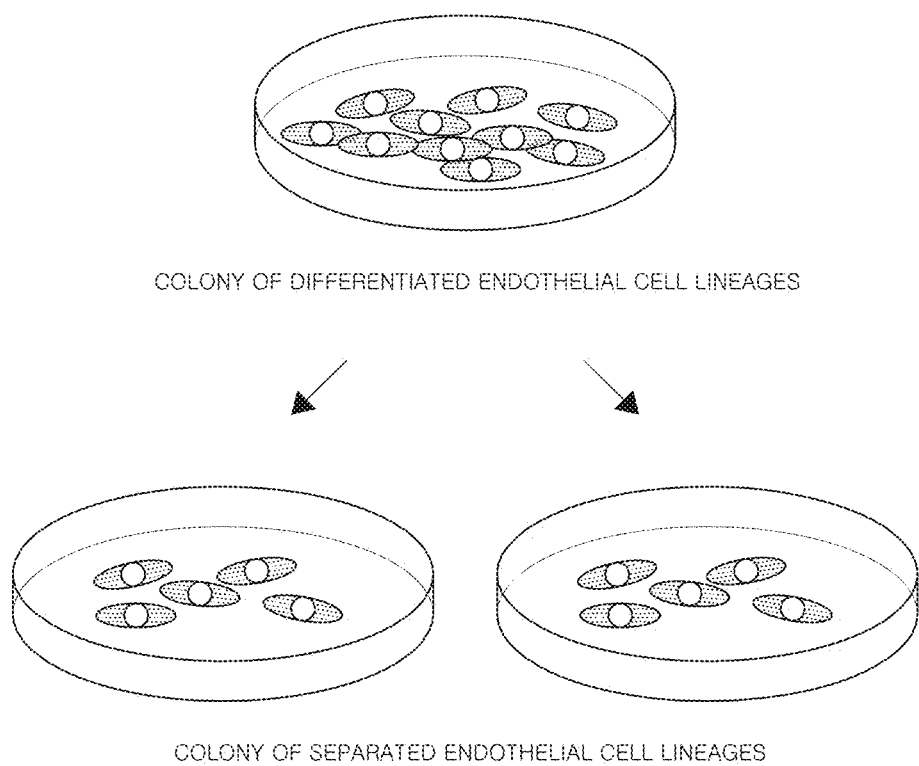

Then, referring to FIG. 9B, colonies composed of differentiated endothelial cell lineages prior to cell selection may be divided and inoculated on two or less plates. At this time, when they are inoculated on more than two plates, the selection yield of vascular endothelial cells may decrease.

Then, cell selection can be performed to obtain only high-purity vascular endothelial cells. Cell selection is a technology for separating differentiated specific cells with high purity. Flow cell sorting and magnetic cell sorting may be used, but cells can be selected using unique cell characteristics.

Figure 9C:
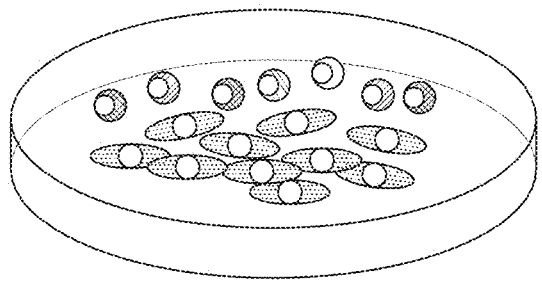
Figure 9C:
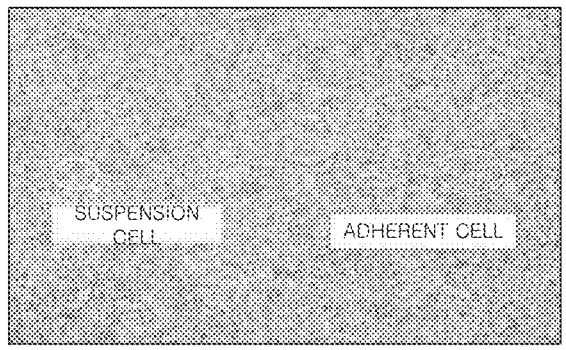

For example, referring to FIG. 9C (a), cells may be separated and selected using selective adhesion of cells having specific surface adhesion to the matrix. More specifically, the time to adhere to the matrix may be different depending on the characteristics of each cell. Accordingly, a heterogeneous endothelial cell lineage is cultured on a plate including a coating film made of a matrix, thereby classifying cells adhering to the coating film of the plate according to the culture time.

Referring to FIG. 9C (b), the vascular endothelial cells adhered within a specific time is shown. All cells adhered at the same time have the same shape, and suspension cells are regarded as not endothelial cells having the same characteristics and are removed by washing. In this case, the coating film made of the matrix may contain 0.1 mg/ml of collagen, but is not limited thereto, and a coating film including various matrices to which vascular endothelial cells may specifically adhere over time may be used.

Figure 9D:
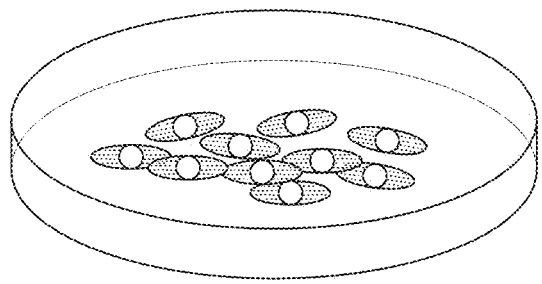
Figure 9D:
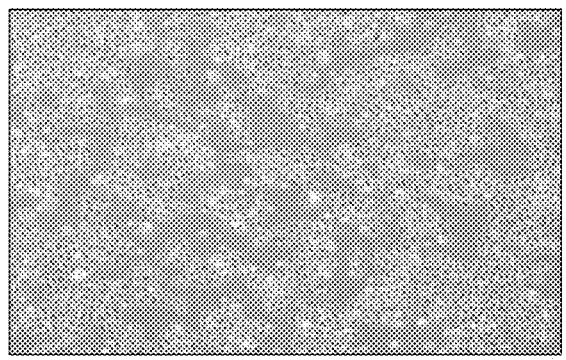

Finally, referring to FIG. 9D (a), only cells adhered to the coating film of the plate are selected. Referring to FIG. 9D (b), the selected cells have the same shape, meaning that they are endothelial cells having the same characteristics. Accordingly, only high-purity vascular endothelial cells may be selected and used by the above-described method. The adherent time may be 4 hours to 20 hours. That is, cell selection may mean endothelial cell separation from 4 hours to 20 hours after seeding.

Again, as shown in FIG. 8, in the second seeding step to suspend the selected vascular endothelial cells with a maintenance medium and to seed the suspension on a plate (S150), the high purity selected vascular endothelial cells are suspended with a maintenance medium and the result is seeded on a plate coated with a coating film containing 0.1 mg/ml of collagen.

Finally, in the passage culture step to proliferate the second seeded vascular endothelial cells in the maintenance medium (S160), the passage culture is performed in the maintenance medium containing growth factors, 4 ng/ml to 6 ng/ml FGF2, 5 ng/ml to 10 ng/ml EGF, and 10 ng/ml to 30 ng of VEGF-A, 20 ng/ml to 50 ng/ml of ascorbic acid and DMEM/F-12, thereby inducing proliferation of vascular endothelial cells Here, passage culture may be performed from passages 1 to 4. More specifically, when culturing vascular endothelial cells for more than passages 4, proliferative and differentiation capacity is reduced, and when cultured for a long period of time, cell clumps, etc., may be formed and may be accompanied by chromosomal mutations. Accordingly, referring to FIG. 10, results showing microscopic images of vascular endothelial cells according to the number of culture passages are illustrated. It is shown that all vascular endothelial cells according to each passage have the same size and shape, and cell clumps is not generated until passage 4. Here, when cell clumps are formed, cell cycle arrest occurs, thereby inducing self-differentiation, so it may be difficult to differentiate into desired cells, that is, vascular endothelial cells. Therefore, passage culture capable of securing a large number of high-purity cells while maintaining the characteristics of vascular endothelial cells may preferably be passages 1 to 4.

Furthermore, ascorbic acid is an antioxidant, is involved in procollagen synthesis, and is a cofactor associated with an increase in type 1 collagen production. Ascorbic acid may stimulate and regulate the proliferation of various mesoderm-derived cells such as adipocytes, osteoblasts, and chondrocytes in vitro. Furthermore, when ascorbic acid is added at a specific concentration to the culture medium for mesenchymal stem cells, it acts as a cell growth promoter to increase cell proliferation and to even promote DNA synthesis. However, if the concentration of ascorbic acid is not appropriate, it may rather inhibit the proliferation of cells and have cytotoxicity to cause apoptosis. Accordingly, the appropriate concentration of ascorbic acid capable of improving cell proliferation may be 20 ng/ml to 50 ng/ml but is not limited thereto.

According to the culture method for maintaining vascular endothelial cell characteristics according to an example of the present invention as described above, there is an effect of producing vascular endothelial cells from human pluripotent stem cells in a high yield.

Confirmation of Maintenance of Vascular Endothelial Cell Characteristics in the Maintenance Medium According to an Example of the Present Invention Hereinafter, the maintenance of vascular endothelial cell characteristics in the maintenance medium according to an example of the present invention is described in detail with reference to FIGS. 11A to 12.

Figure 11A:
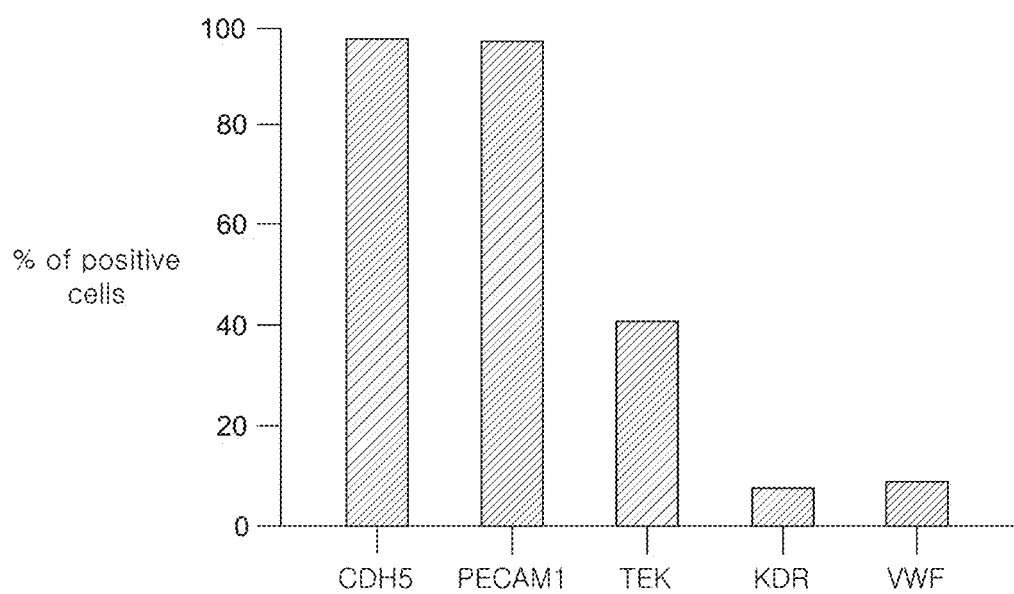
FIGS. 11A to 11C illustrate the result of the relative expression levels of positive vascular endothelial cells with respect to markers in the culture method of maintaining vascular endothelial cell characteristics according to an example of the present invention.
Figure 11B:
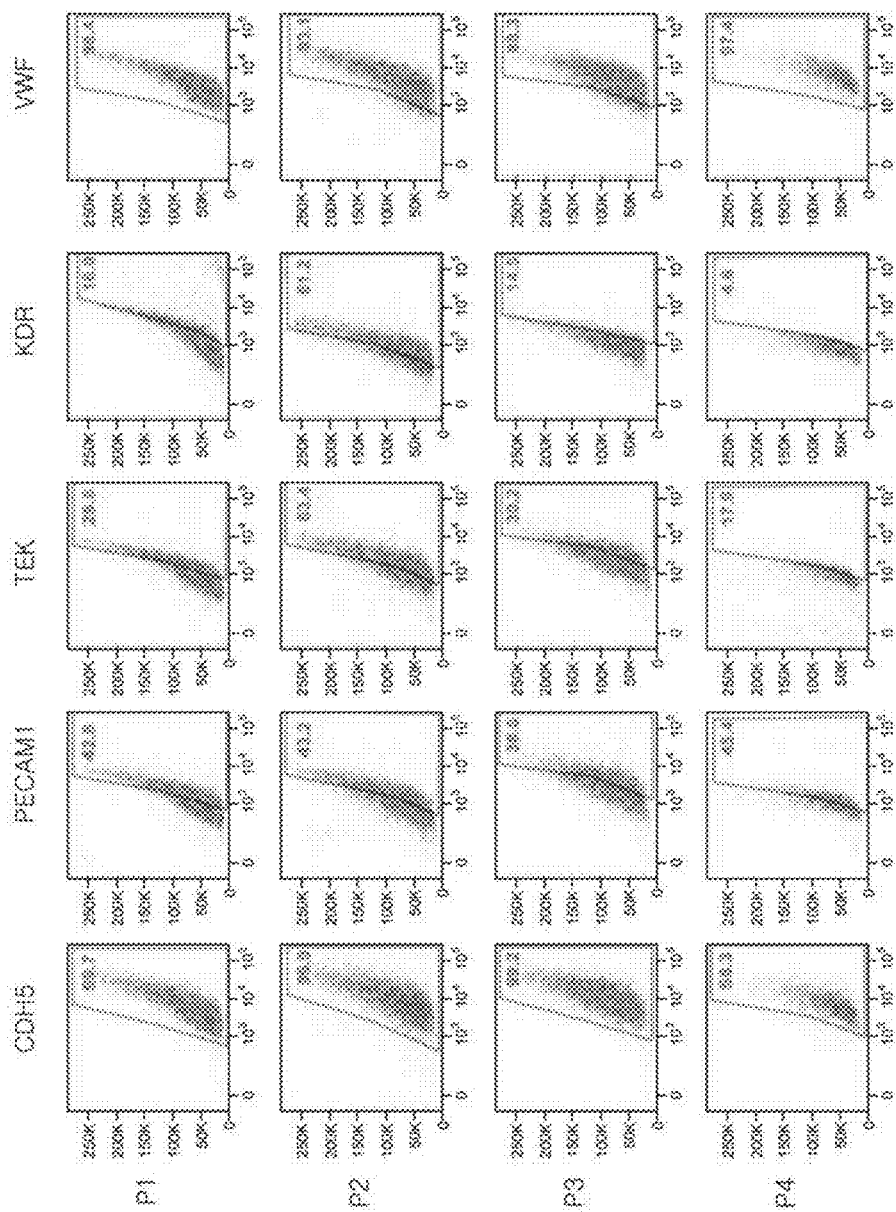
Figure 11C:
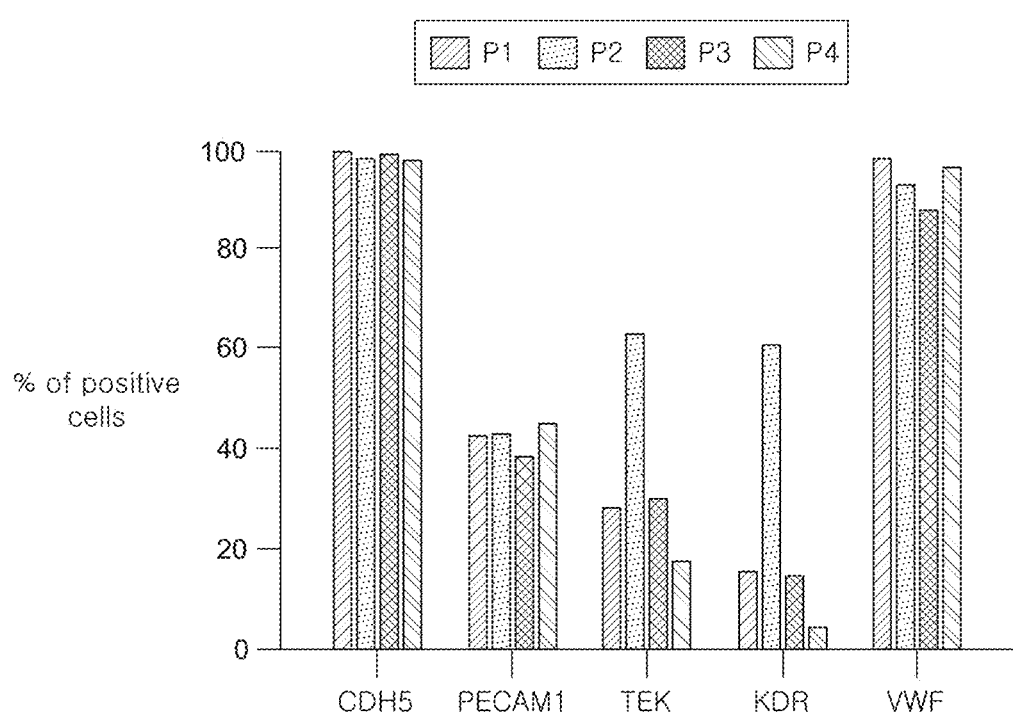

FIGS. 11A to 11C illustrate the relative expression levels of positive vascular endothelial cells with respect to markers in the culture method of maintaining vascular endothelial cell characteristics according to an example of the present invention.

First, referring to FIG. 11A, the relative marker expression level of the vascular endothelial cell positive control is shown. More specifically, CDH5, PECAM1, TEK, KDR and VWF are expressed in the vascular endothelial cell positive control group. This may mean that CDH5, PECAM1, TEK, KDR, and VWF are markers exhibiting characteristic of vascular endothelial cells. Accordingly, by confirming CDH5, PECAM1, TEK, KDR and VWF, which are markers specifically expressed in vascular endothelial cells, it is possible to confirm the maintenance of the characteristics of vascular endothelial cells.

Accordingly, referring to FIG. 11B, the result of the marker expression level of vascular endothelial cells according to passage culture in the maintenance medium is illustrated. More specifically, the positive expression level of vascular endothelial cells for CDH5 marker according to passage culture in the maintenance medium is 99.7% at passage 1, 99.0% at passage 2, 99.2% at passage 3, and 98.3% at passage 4.

In addition, the positive expression level of vascular endothelial cells for PECAM1 marker according to passage culture in the maintenance medium is 42.8% at passage 1, 43.2% at passage 2, 38.6% at passage 3, and 45.4% at passage 4.

In addition, the positive expression level of vascular endothelial cells for TEK marker according to passage culture in the maintenance medium is 28.8% at passage 1, 63.4% at passage 2, 30.2% at passage 3, and 17.9% at passage 4.

In addition, the positive expression level of vascular endothelial cells for the KDR marker according to passage culture in the maintenance medium is 16.0% at passage 1, 61.2% at passage 2, 14.5% at passage 3, and 4.6% at passage 4

In addition, the positive expression level of vascular endothelial cells for the VWF marker according to passage culture in the maintenance medium is 98.4% at passage 1, 93.1% at passage 2, 88.3% at passage 3, and 97.4% at passage 4.

Therefore, the vascular endothelial cells according to passage culture in the maintenance medium may refer to high purity differentiated vascular endothelial cells that show high expression levels for CDH5, PECAM1, TEK, KDR and VWF, the markers identified in the vascular endothelial cell positive control group. High purity may mean purity of 98% or more, for example, it may mean that CDH5-positive cell expression is maintained at 98% or more until passage 4.

Furthermore, referring to FIG. 11C, a graph showing positive expression levels of vascular endothelial cells for markers according to passage culture in the above-described maintenance medium is illustrated. More specifically, the number of CDH5-expressing positive cells is maintained to be 98% or more until passage 4 for the CDH5 marker, the number of CDH5-expressing positive cells is maintained to be 40% or more until passage 4 for the PECAM1 marker, and the number of CDH5-expressing positive cells is maintained to be 88% or more until passage 4 for the VWF marker. However, for TEK and KDR markers, the number of marker-expressing positive cells for each passage is not uniform or tends to decrease, but the number of marker-expressing positive cells up to passage 3 is maintained higher than that of the positive control group of vascular endothelial cells. Therefore, when the vascular endothelial cells are passage cultured in the maintenance medium, the expression of CDH5, PECAM1, TEK, KDR and VWF, which are the markers identified in the positive control group of vascular endothelial cells, is maintained continuously until passage 4. This may mean that culturing of vascular endothelial cells in a maintenance medium may proliferate while maintaining the characteristics of vascular endothelial cells.

Figure 12:
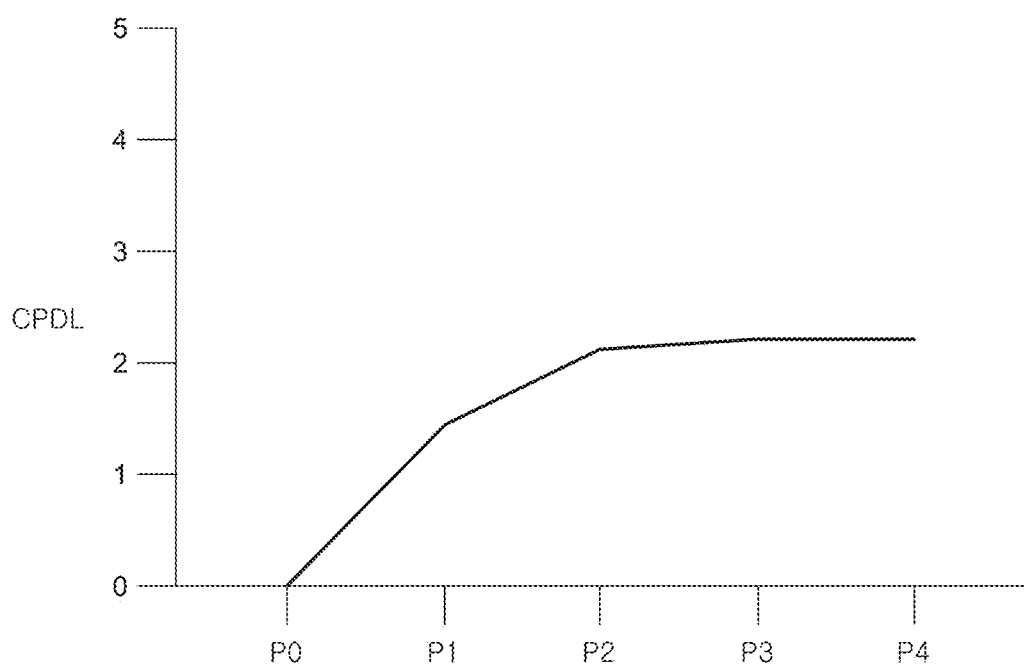
FIG. 12 illustrates the result of the cell growth rate according to the number of passages of vascular endothelial cells in the culture method of maintaining vascular endothelial cell characteristics according to an example of the present invention.

Furthermore, referring to FIG. 12, the cell growth rate according to the number of passages of vascular endothelial cells in the culture method of maintaining vascular endothelial cell characteristics according to an example of the present invention is illustrated. Here, as cells proliferate using binary fission, the cell growth rate is determined according to how long it takes for one cell to become two cells. This is called the doubling time, which may be used as a measure for evaluating the growth rate of cells, that is, the proliferative capacity. Accordingly, the cell growth rate is expressed as a cumulative population doubling level (CPDL) value according to the number of passages of vascular endothelial cells. CPDL is an index of cell growth rate. More specifically, when the CPDL value is 10, it may mean that the cell has divided 10 times. If this is calculated numerically, it may mean that one cell proliferates up to about 1,000 cells. CPDL was calculated by Equation 1 below.

$$CPDL = \ln(Nf/Ni)/\ln 2 \quad \text{[Equation 1]}$$

In this case, Ni means the number of initially seeded cells, Nf means the number of final cells, and ln means the natural logarithm.

The CPDL values of vascular endothelial cells cultured in the maintenance medium are shown to have values in the range of 1 to 2.5 in passages 1 to 4. This may mean that one vascular endothelial cell may proliferate up to 22.5 cells.

As a result, the proliferation culture of vascular endothelial cells in the culture method of maintaining vascular endothelial cell characteristics according to an example of the present invention may allow the proliferation of uniform vascular endothelial cells without change in cell shape and characteristics despite repeated culturing.

Comparison of Maintenance of Vascular Endothelial Cell Characteristics According to Media Hereinafter, the maintenance of vascular endothelial cell characteristics according to the medium is described in detail with reference to FIGS. 13A to 15. In this case, Example 1 according to an example of the present invention is set as a medium of maintaining vascular endothelial cell characteristics containing 4 ng/ml to 6 ng/ml of FGF2, 5 ng/ml to 10 ng/ml of EGF, 10 ng/ml to 30 ng/ml of VEGF-A, 20 to 50 ng/ml of ascorbic acid and DMEM/F-12 according to an example of the present invention.

Furthermore, Comparative Example 1 is set as a conventional cell culture medium containing hFGF-B, VEGF, R3-IGF-1, ascorbic acid, hEGF, heparin, and GA-1000, Comparative Example 2 is set as the differentiation medium of vascular endothelial cells of the present invention containing 4 ng/ml to 6 ng/ml FGF2, 5 ng/ml to 10 ng/ml of EGF, 10 ng/ml to 30 ng/ml of VEGF-A, 20 ng/ml to 30 ng/ml of DLL4, and DMEM/F-12.

Figure 13A:
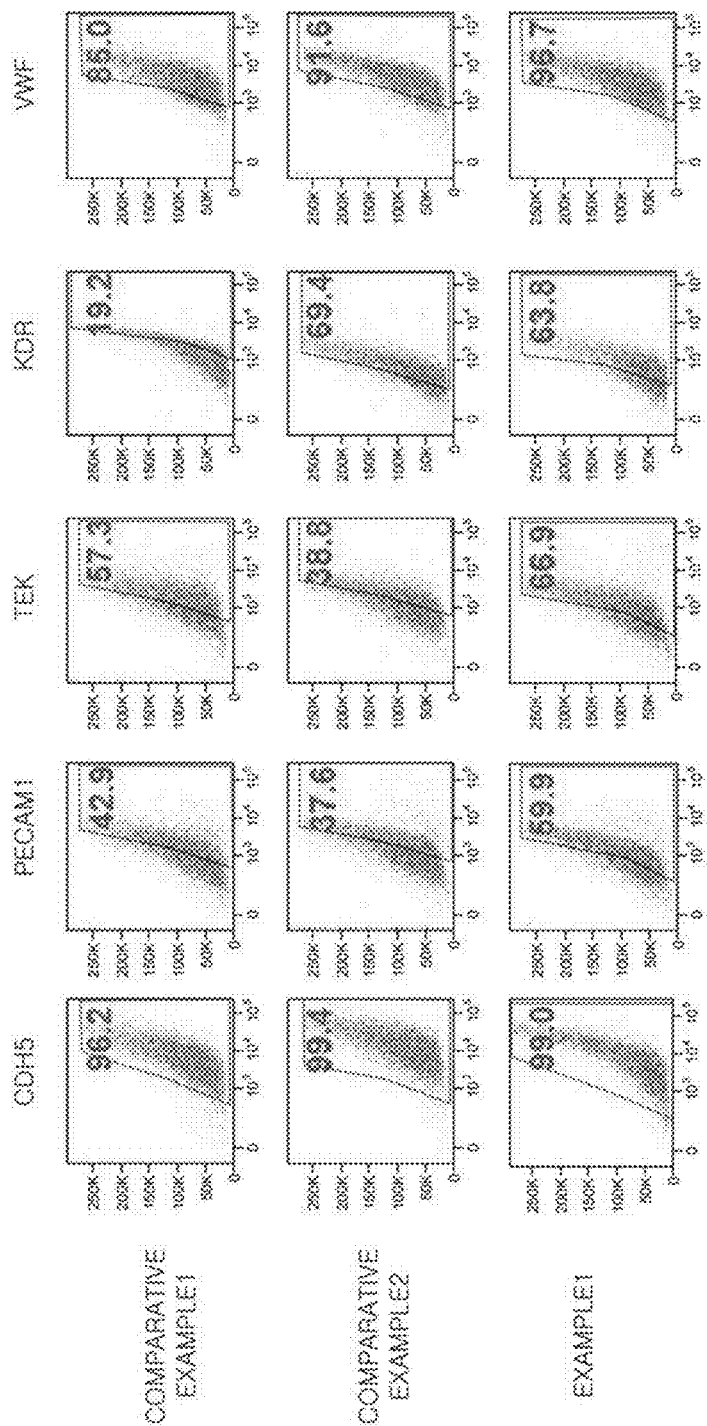
FIGS. 13A and 13B illustrate the result of the relative expression levels of positive vascular endothelial cells with respect to markers according to the vascular endothelial cell culture medium in the culture method of maintaining vascular endothelial cell characteristics according to an example of the present invention.
Figure 13B:
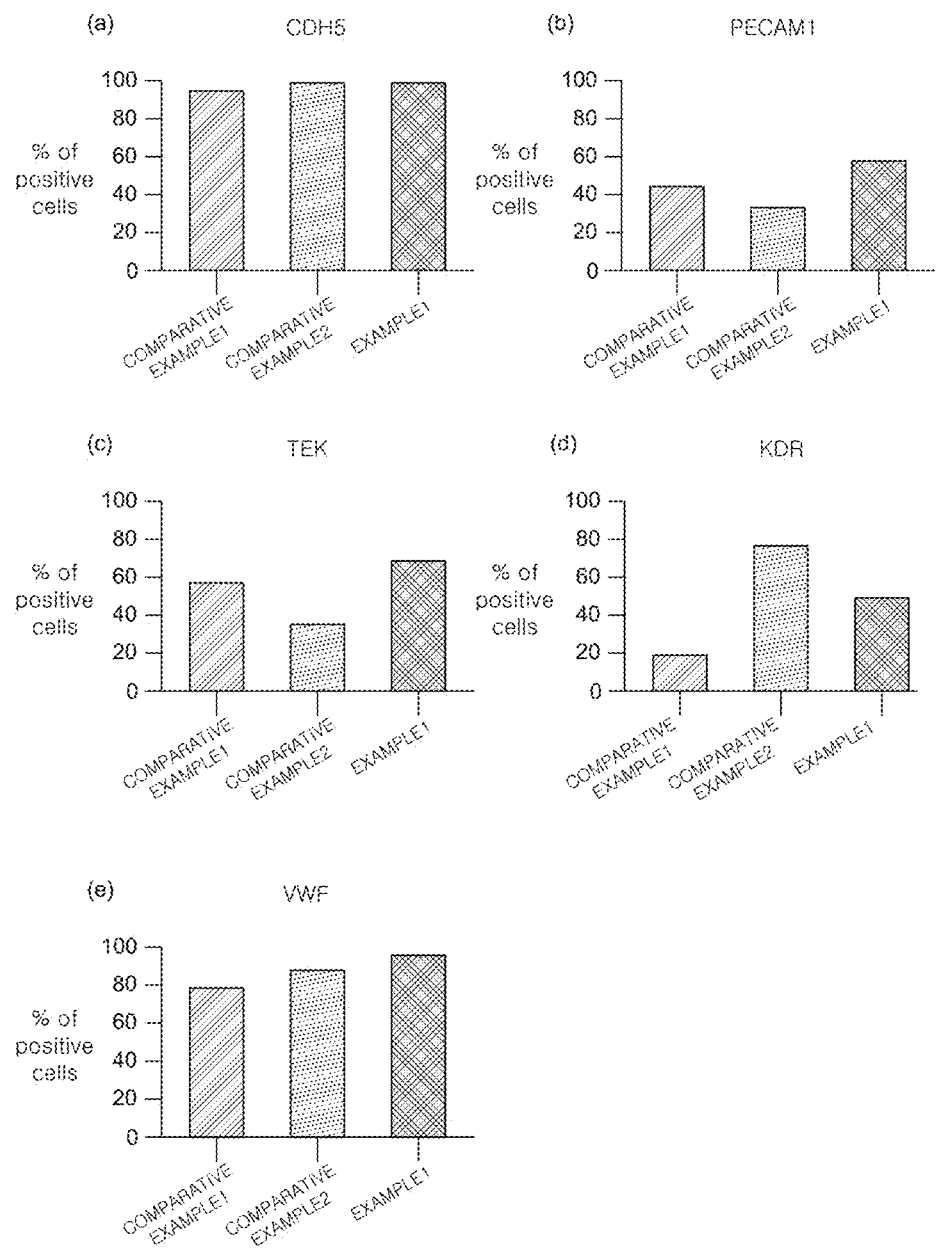

First, FIGS. 13A and 13B illustrate the relative expression levels of positive vascular endothelial cells with respect to markers according to the vascular endothelial cell culture medium in the culture method of maintaining vascular endothelial cell characteristics according to an example of the present invention.

More specifically, referring to FIG. 13A, the results of the marker expression level of vascular endothelial cells according to the culture medium are illustrated. The positive expression level of vascular endothelial cells for the CDH5 marker is shown to be 96.2% in Comparative Example 1, 99.4% in Comparative Example 2, and 99.0% in Example 1.

In addition, the positive expression level of vascular endothelial cells for PECAM1 marker is 42.9% in Comparative Example 1, 37.6% in Comparative Example 2, and 59.9% in Example 1.

In addition, the positive expression level of vascular endothelial cells for TEK marker is 57.3% in Comparative Example 1, 38.8% in Comparative Example 2, and 66.9% in Example 1.

In addition, the positive expression level of vascular endothelial cells for KDR marker is 19.2% in Comparative Example 1, 69.4% in Comparative Example 2, and 63.8% in Example 1.

In addition, the positive expression level of vascular endothelial cells for VWF marker is 85.0% in Comparative Example 1, 91.6% in Comparative Example 2, and 96.7% in Example 1.

Therefore, the vascular endothelial cells according to the culture medium may mean vascular endothelial cells showing expression for CDH5, PECAM1, TEK, KDR and VWF, which are markers identified in the vascular endothelial cell positive control group.

However, referring to FIG. 13B, a graph showing the positive expression level of vascular endothelial cells for markers according to the above-described culture medium is illustrated. More specifically, referring to FIGS. 13B (a) and 13B (e), for the CDH5 and VWF markers, which are characteristic indicators of vascular endothelial cells, Comparative Example 1, Comparative Example 2, and Example 1 all show a high number of positive marker-expressing cells. On the other hand, referring to FIGS. 13B (b), 13B (c) and 13B (d), for the PECAM1, TEK and KDR markers, which are characteristic indicators of vascular endothelial cells, Example 1 show a higher number of positive marker-expressing cells than Comparative Examples 1 and 2. In this case, it may be difficult to prove that the differentiated cells are vascular endothelial cells only by confirming the expression of a small number of indicators. Accordingly, the higher the number of indicators related thereto, the higher the purity of the endothelial cells may be. Therefore, it may mean that Example 1, which shows a high number of positive marker-expressing cells for all markers specifically expressed on vascular endothelial cells, is the highest purity differentiated vascular endothelial cells.

Figure 14:
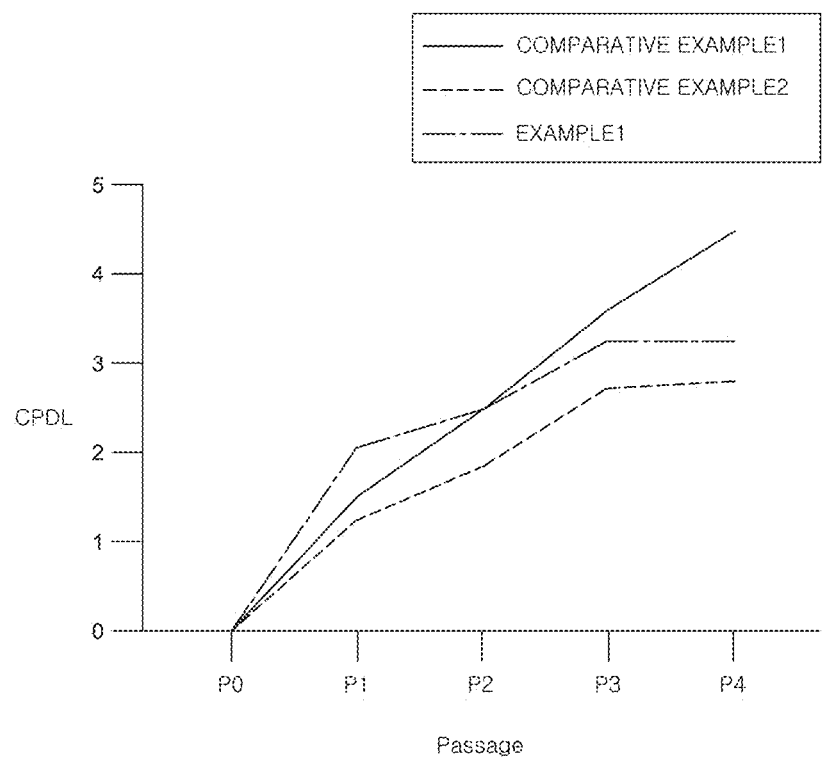
FIG. 14 illustrates the result of the cell growth rate according to the culture medium of vascular endothelial cells according to the number of passages of the vascular endothelial cells in the culture method of maintaining vascular endothelial cell characteristics according to an example of the present invention.

Further, referring to FIG. 14, the cell growth rate according to the culture medium of vascular endothelial cells according to the number of passages of the vascular endothelial cells in the culture method of maintaining vascular endothelial cell characteristics according to an example of the present invention is illustrated. More specifically, the CPDL value of the vascular endothelial cells cultured in Comparative Example 1 is shown to have a value within the range of 1 to 4.5 in passages 1 to 4. This may mean that one vascular endothelial cell may proliferate up to 24.5.

In addition, the CPDL value of the vascular endothelial cells cultured in Comparative Example 2 is shown to have a value within the range of 1 to 3 in passages 1 to 4. This may mean that one vascular endothelial cell may proliferate up to 23.

In addition, the CPDL value of the vascular endothelial cells cultured in Example 1 is shown to have a value within the range of 1 to 3.5 in passages 1 to 4. This may mean that one vascular endothelial cell may proliferate up to 23.5. Therefore, the cell growth rate may be the best in Comparative Example 1, which may proliferate the most. However, when the cells rapidly and explosively increase, the cells may form cell clumps, thereby inducing differentiation into unwanted cells.

Figure 15:
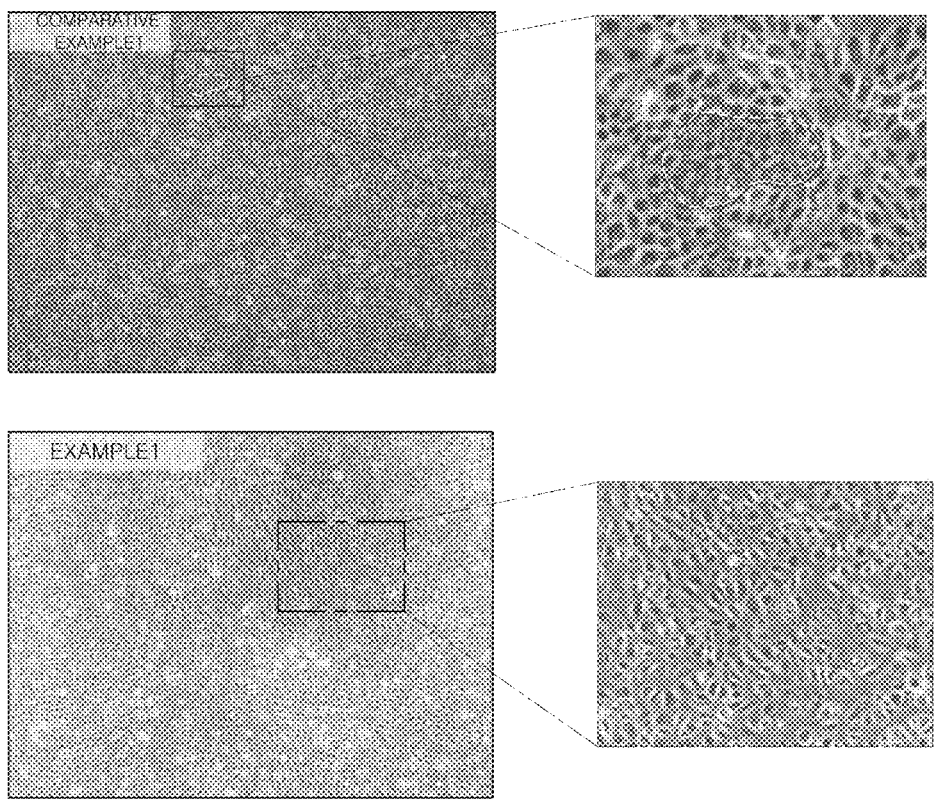
FIG. 15 illustrates the result of microscopic images of vascular endothelial cells according to a culture medium of vascular endothelial cells in the culture method of maintaining vascular endothelial cell characteristics according to an example of the present invention.

Accordingly, referring to FIG. 15, microscopic images of vascular endothelial cells according to a culture medium of vascular endothelial cells in the culture method of maintaining vascular endothelial cell characteristics according to an example of the present invention. More specifically, it is shown that cell clumps are formed in the vascular endothelial cells cultured in Comparative Example 1. On the other hand, it is shown that only individual vascular endothelial cells are formed without the formation of cell clumps in Example 1. Therefore, while differentiation is induced only in the desired direction, a medium having excellent proliferative capacity may be Example 1.

As a result, the medium of maintaining vascular endothelial cell characteristics according to an example of the present invention does not cause a problem in that the proliferative and regenerative capacity is reduced as the cell culture progresses, and the vascular endothelial cell characteristics are altered along with the mutation, thereby having the effect of proliferating and maintaining the vascular endothelial cells in high purity.

Accordingly, the present invention may provide uniform vascular endothelial cells, thereby providing vascular endothelial cells that may be stably used in clinical applications.

Although the examples of the present invention have been described in more detail with reference to the accompanying drawings, the present invention is not necessarily limited to these examples, and various modifications may be made within the scope without departing from the technical spirit of the present invention. Accordingly, the examples disclosed in the present invention are illustrative rather than limiting the technical spirit of the present invention, and the scope of the technical spirit of the present invention is not limited by these examples. Therefore, it should be understood that the examples described above are illustrative in all respects and not restrictive. The protection scope of the present invention should be construed by the following claims, and all technical spirits within the scope equivalent thereto should be construed as being included in the scope of the present invention.

[National R&D Project Supporting the Present Invention]
 [Project unique number] HI16C2211
 [Government department] Ministry of Health and Welfare
 [Research and management institution] Korea Health Industry Development Institute
 [Title of research project] Advanced medical technology development program
 [Title of research task] Determination of the production and therapeutic effect of human induced pluripotent stem cell-derived endothelial cells
 [Contribution rate] 1/1
 [Name of project performance institution] Industry-Academic Cooperation Foundation, Yonsei University
 [Research period] Apr. 1, 2019 to Jan. 31, 2020

The invention claimed is:

1. A method of separating vascular endothelial cells, the method comprising steps of:
 obtaining a cell line of an endothelial cell lineage differentiated from human pluripotent stem cells from a differentiation medium;
 filtering the obtained cell line using a filter;
 culturing the filtered cell line on a matrix for a period of 4 to 20 hours; and
 separating homogenous endothelial cells attached to the matrix from the cultured cell line.

2. The method of claim 1, wherein the filter has a pore spacing in the range of 20 µm to 40 µm.

3. The method of claim 1, wherein the matrix comprises at least one of collagen, fibrin, fibronectin, vitronectin, basement membrane extract, gelatin, laminin, heparin, polylysine, and hyaluronic acid.

4. The method of claim 3, wherein the matrix is collagen at a concentration of 0.1 mg/ml.

5. The method of claim 1, wherein culturing the filtered cell line is performed in DMEM/F-12 medium containing cell growth factors and ascorbic acid.

6. The method claim 5, wherein the cell growth factors comprise at least one of fibroblast growth factor-1 (FGF-1), FGF-2 (bFGF), FGF-3, FGF-4, FGF-5, FGF-6, epidermal growth factor (EGF), keratinocyte growth factor (KGF), hepatocyte growth factor (HGF), transforming growth factor-a (TGF-a), TGFβ, angiopoietin 1, angiopoietin 2, erythropoietin, neuropilin, Insulin-like Growth Factor 1 (IGF-1), osteopoline, pleiotrophin, activin, endothelin 01 and vascular endothelial growth factor-A (VEGF-A).

7. The method of claim 1, wherein the culturing the filtered cell line comprises seeding the filtered cell line on two matrices.

8. The method of claim 1, wherein a gene expression level of CDH5 is 12 times higher than before the separation.

9. The method of claim 1, wherein a gene expression level of VWF is 2 times higher than before the separation.

10. The method of claim 1, further comprising a step of packaging the separated vascular endothelial cells in a cell therapeutic composition for treating a cardiovascular disease.

11. The method according to claim 10, wherein the cardiovascular diseases include at least one of ischemic heart disease, heart failure, hypertensive heart disease, arrhythmia, heart valve disease, ventricular septal defect, congenital heart disease, cardiomyopathy, pericardial disease, stroke, peripheral vascular disease, aneurysm, arteriosclerosis, hypertension, angina pectoris, and myocardial infarction.

* * * * *